(12) United States Patent
Hong et al.

(10) Patent No.: US 12,484,880 B2
(45) Date of Patent: Dec. 2, 2025

(54) SYSTEMS AND METHODS FOR VOLUME-BASED ULTRASOUND GUIDANCE AND IMAGE ANALYSIS

(71) Applicant: Caption Health, Inc., San Mateo, CA (US)

(72) Inventors: Ha Hong, San Ramon, CA (US); Kilian Koepsell, San Francisco, CA (US); Michael G. Cannon, Haverford, PA (US); Nripesh Parajuli, Seattle, WA (US); Nicolas Poilvert, Seattle, WA (US)

(73) Assignee: Caption Health, Inc., Waukesha, WI (US)

( * ) Notice: Subject to any disclaimer, the term of this patent is extended or adjusted under 35 U.S.C. 154(b) by 130 days.

(21) Appl. No.: 18/426,996

(22) Filed: Jan. 30, 2024

(65) Prior Publication Data

US 2024/0252153 A1 Aug. 1, 2024

Related U.S. Application Data

(60) Provisional application No. 63/442,004, filed on Jan. 30, 2023.

(51) Int. Cl.
*A61B 8/00* (2006.01)
*G06T 7/00* (2017.01)

(52) U.S. Cl.
CPC ............ *A61B 8/467* (2013.01); *A61B 8/4245* (2013.01); *A61B 8/466* (2013.01); *G06T 7/0012* (2013.01); *G06T 2207/10016* (2013.01); *G06T 2207/10132* (2013.01); *G06T 2207/20081* (2013.01)

(58) Field of Classification Search
CPC ......... G06T 7/0012; G06T 2207/10132; G06T 2207/20081; A61B 8/42–4263; A61B 34/20; A61B 2034/2063; A61B 2034/2065
See application file for complete search history.

(56) References Cited

U.S. PATENT DOCUMENTS

| | | |
|---|---|---|
| 10,140,710 B2 | 11/2018 | Kreeger |
| 10,470,677 B2 | 11/2019 | Cadieu et al. |
| 10,631,791 B2 | 4/2020 | Cadieu et al. |
| 10,726,548 B2 | 7/2020 | Cadieu et al. |
| 10,806,402 B2 | 10/2020 | Cadieu et al. |
| 10,937,156 B2 | 3/2021 | Bilenko et al. |
| 11,160,510 B2 | 11/2021 | Cadieu et al. |
| 11,166,678 B2 | 11/2021 | Cadieu et al. |
| 11,497,451 B2 | 11/2022 | Cadieu et al. |
| 11,497,475 B2 | 11/2022 | Cannon et al. |

(Continued)

FOREIGN PATENT DOCUMENTS

| | | |
|---|---|---|
| WO | WO-2019075279 A1 | 4/2019 |
| WO | WO-2021034981 A1 | 2/2021 |
| WO | WO-2022241155 A1 | 11/2022 |

OTHER PUBLICATIONS

He et al., Deep residual learning for image recognition. arXiv1512.03385. pp, 1-12 (Dec. 10, 2015).

(Continued)

*Primary Examiner* — Carolyn A Pehlke
(74) *Attorney, Agent, or Firm* — SPQ IP LLC

(57) ABSTRACT

Provided herein are platforms, systems, and methods for providing ultrasound imaging guidance for automatic evaluation of image quality over a plurality of sub-views.

17 Claims, 14 Drawing Sheets

(56) References Cited

U.S. PATENT DOCUMENTS

| | | | |
|---|---|---|---|
| 2015/0214434 A1 | 7/2015 | Fujiwara et al. | |
| 2015/0327838 A1* | 11/2015 | Francis | A61B 8/4433 |
| | | | 600/459 |
| 2018/0153505 A1 | 6/2018 | Cadieu et al. | |
| 2019/0239850 A1* | 8/2019 | Dalvin | A61B 8/4245 |
| 2020/0245970 A1 | 8/2020 | Cadieu et al. | |
| 2020/0245976 A1 | 8/2020 | Cadieu et al. | |
| 2020/0315572 A1* | 10/2020 | Salgaonkar | A61B 5/061 |
| 2021/0052253 A1 | 2/2021 | Cadieu et al. | |
| 2021/0236094 A1 | 8/2021 | Cannon et al. | |
| 2022/0104790 A1 | 4/2022 | Cadieu et al. | |
| 2023/0066948 A1* | 3/2023 | Bharat | A61B 8/12 |
| 2023/0075063 A1* | 3/2023 | Aladahalli | A61B 8/523 |
| 2023/0094631 A1* | 3/2023 | Webb | A61B 8/54 |
| | | | 600/443 |

OTHER PUBLICATIONS

Nix et al., Estimating the mean and variance of the target probability distribution. IEEE International Conference on Neural Networks. pp. 55-60 (1994).

Xiong, et al. The human splicing code reveals new insights into the genetic determinants of disease. Science. 347(6218):1254806, pp. 1-20 (2015).

* cited by examiner

SYSTEMS AND METHODS FOR VOLUME-BASED ULTRASOUND GUIDANCE AND IMAGE ANALYSIS

CROSS-REFERENCE

This application claims the benefit of U.S. Provisional Application No. 63/442,004, filed Jan. 30, 2023, which is incorporated herein by reference in its entirety.

BACKGROUND

Ultrasound imaging is a non-invasive diagnostic modality that does not use ionizing radiation, provides a wide range of medical applications, images tissue and blood flow, provides exhaustive clinical measurements, and is affordable and portable. Unlike many other imaging methods however, ultrasound requires extensive training of the person operating the device and acquiring the images. The correct methods to apply the ultrasound transducer to the patient are complex and challenging to learn, which limits the reach of ultrasound in patient care. Accordingly, there is a lack of ultrasound imaging systems and devices that can be successfully used by non-expert users.

SUMMARY

Disclosed herein are platforms, systems, and methods for real-time ultrasound guidance that facilitates efficient and accurate ultrasound imaging. In particular, the ultrasound guidance can be configured as a sequence or plurality of simple and informative instructions or indications thereof. This sequence of instructions may be configured to account for potentially rapid fluctuations and/or contradictions in image analyses which can arise for various reasons such as poor image quality and/or probe positioning.

Ultrasound can be used to image various organs and systems including cardiac, vascular, pulmonary, abdominal, obstetric, gynecological, musculoskeletal, small organs, nerves and more. Each of these clinical applications calls for different, highly demanding skills on the part of the operator of the ultrasound device. To learn how to properly scan and perform diagnostic-quality studies takes years of study and practice. Moreover, current ultrasound devices have a large number of transducer types available, a multitude of scanning modes, a dense array of interactive imaging settings and parameters, and large numbers of measurements and calculations that can be performed. This complexity is greatly increased by the extensive number of patient conditions, body types, and diseases. To master all of these factors and produce high-quality studies is a laborious task for highly-trained experts.

The platforms, systems, and methods disclosed herein provide improved ultrasound guidance compared to conventional ultrasound systems. For example, a conventional ultrasound device may provide static lists of protocols to remind the person scanning, such as a physician, sonographer, or other trained medical professional, what anatomical targets to seek and which sub-views to obtain for a particular type of examination. Systems also have sophisticated presets that combine multitudinous imaging settings such as image gain, frame rate, scanning depth, grayscale presentation, blood flow filters, and imaging regions of interest in order to improve workflow for users. However, these presets can be complicated and difficult to use, and the user must know navigational techniques and presets by memory and experience in order to effectively operate the ultrasound device.

Disclosed herein, in some aspects, are platforms, systems, and methods that use image processing or machine learning methods to analyze images in real-time and derive information from the image about the pose of the probe and how it relates in space to a correct and diagnostic-quality image. These methods can be used to provide instructions to the user for how to hold and manipulate the probe for better results. The ultrasound guidance technology can make it possible for lesser-trained users to perform an ultrasound examination.

In one aspect, described herein are methods for evaluating ultrasound image quality. In some embodiments, the methods comprise receiving an ultrasound image of a subject acquired through an ultrasound imaging system. In some embodiments, the methods comprise evaluating ultrasound images using a trained machine learning model to determine a clinical image quality of an image with respect to a plurality of sub-views of a target structure of a subject. In some embodiments, the methods comprise providing an indication of image quality for each of at least two of a plurality of sub-views to a user of an ultrasound imaging system.

In another aspect, described herein are methods for guiding an ultrasound imaging procedure. In some embodiments, the methods comprise receiving one or more ultrasound images of a subject acquired through an ultrasound imaging system. In some embodiments, the methods comprise evaluating said one or more ultrasound images using a trained machine learning model to determine a current position of a probe of an ultrasound imaging system and a clinical image quality of one or more ultrasound images with respect to a plurality of sub-views of a target structure of a subject.

In some embodiments, the methods comprise identifying an optimal probe position for imaging for at least two of a plurality of sub-views. In some embodiments, the methods comprise generating one or more probe movements for reducing a difference between a current probe position each identified optimal probe positions. In some embodiments, the methods comprise providing guidance instructions to a user of an ultrasound imaging system to make at least one generated probe movement.

In some embodiments, generating one or more probe movements comprises computing a confidence or probability that a generated probe movement will improve a clinical quality of acquired images. In some embodiments, guidance instructions prompt a user to make a determined movement determined to have a highest confidence or probability of improving clinical image quality compared to alternate generated movements. In some embodiments, guidance instructions comprise a plurality of generated movements.

In some embodiments, a plurality of generated movements comprise movements corresponding to different sub-views. In some embodiments, a plurality of generated movements comprise alternate movements corresponding to a single sub-view.

In some embodiments, guidance instructions comprise an indication of the computed confidence or probability of an alternate movements corresponding to a single sub-view. In some embodiments, a plurality of sub-views comprise standard canonical views and non-standard views. In some embodiments, standard canonical views and non-standard views comprise both on- and off-axis sub-views. In some embodiments, non-standard views comprise clinically useful information despite an overall clinical quality of an optimal image of a non-standard view being lower than a standard view (e.g. an on-axis, canonical view) of a similar imaging target.

In some embodiments, guidance instructions are provided in real time. In some embodiments, guidance instructions comprise generated movements expected to direct a user to an optimal probe position for a selected sub-view of a protocol. In some embodiments, guidance instructions comprise generated movements expected to direct a user to an optimal probe position for a sub-view which is most proximate to a current probe position. In some embodiments, said guidance comprises a graphical representation of each probe movement, an audio representation of said probe movement, a haptic representation of said movement, or any combination thereof. In some embodiments, said probe movements comprises rotation, translation, tilting, rocking, pressing, or any combination thereof.

In some embodiments, visual indicators, said audio indicators, said haptic indicators, or any combination thereof are configured to convey information regarding said confidence or probability of improving clinical image quality for each of said generated probe movements. In some embodiments, at least one visual indicator comprises a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof.

In some embodiments, a brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, any of the methods provided herein further comprise providing instructions for improving clinical image quality using patient instructions, ultrasound scan system settings, or both. In some embodiments, patient instructions comprise patient breathing or body position. In some embodiments, ultrasound scan system settings comprise scan depth, gain, or both.

In some embodiments, instructions are not identified based on a threshold correlated with image quality. In some embodiments, an ultrasound imaging system is a portable ultrasound imaging system. In some embodiments, an ultrasound imaging system is configured for performing echocardiography.

In some embodiments, any of the methods described herein can comprise receiving one or more additional ultrasound images acquired through said ultrasound imaging system after displaying said guidance. In some embodiments, any of the methods described herein can comprise analyzing at least a subset of one or more ultrasound images or one or more additional ultrasound images to determine clinical image quality of a video image clip. In some embodiments, an imaging workflow of the method further comprises at least one of automatic image saving, best clip saving, automatic image labelling, and automatic diagnostic measurements and/or combinations thereof. In some embodiments, an imaging target comprises a feature of a heart of a subject and an automatic diagnostic measurement is a measurement related to cardiac function.

In some embodiments, a measurement related to cardiac function comprises an image-derived EKG or an ejection fraction.

In some embodiments, any of the methods described herein can comprise automatically saving multiple instances of the same canonical view and/or the same sub-view based at least partially on detection of diagnostic differences between the multiple instances.

In some embodiments, automatically saving the best image clips of multiple instances and/or automatically labeling image clips with a corresponding sub-view. In some embodiments, automatic labeling further comprises labeling a sub-view with an identifier of whether or not the sub-view corresponds to a standard view (e.g. an on-axis canonical view).

In some embodiments, any of the methods described herein can comprise receiving one or more ultrasound images of a subject acquired through an ultrasound imaging system. In some embodiments, any of the methods described herein can comprise evaluating one or more ultrasound images using a trained machine learning model comprising a representation of a three-dimensional structure of a target volume of a subject to determine a current position of a probe of an ultrasound imaging system and/or a clinical image quality. In some embodiments, any of the methods described herein can comprise identifying an optimal probe position for imaging for at least one sub-view of a target volume of a subject. In some embodiments, any of the methods described herein can comprise generating one or more probe movements for reducing a difference between a current probe position and an identified optimal probe position. In some embodiments, any of the methods described herein can comprise providing guidance instructions to a user of an ultrasound imaging system to make at least one generated probe movement.

In some embodiments, any of the methods described herein can comprise presenting to a user a user interface comprising a representation of a three-dimensional structure of a target volume of a subject to be imaged. In some embodiments, any of the methods described herein can comprise receiving from a user a selection of a target feature within a target volume. In some embodiments, selection comprises three-dimensional coordinates of a target feature within a target volume.

In some embodiments, an identified optimal probe position comprises an optimal probe position for imaging a selected target feature. In some embodiments, a representation of a three-dimensional structure of a target volume of a subject to be imaged comprises at least part of a representation comprised by a machine learning algorithm. In some embodiments, a representation of a three-dimensional structure of a target volume of a subject to be imaged comprises an empirical model of an ideal target volume of a subject. In some embodiments, a representation of a three-dimensional structure of a target volume of a subject to be imaged is a representation of an empirical model of an ideal target volume of a subject.

In some embodiments, a representation of a three-dimensional structure of a target volume comprised by a machine learning model comprises information about a structural relationship between common feature of a plurality of sub-views. In some embodiments, a machine learning model is trained using a plurality of two-dimensional ultrasound image or image clips. In some embodiments, a machine learning model is trained using a plurality of three-dimensional ultrasound images or image clips.

In some embodiments, a machine learning model is configurable to render a three-dimensional surface of a target volume based on information learned from a collection of training images. In some embodiments, a collection of training images does not comprise images collected by a 3D-ultrasound system. In some embodiments, a collection of training images comprises both two dimensional images and images collected by a 3D-ultrasound system. In some embodiments, a collection of training images consists exclusively of images collected by a 3D-ultrasound system.

In some embodiments, any method described herein can comprise rendering a three-dimensional representation of a target feature within a target volume in real time from a received one or more ultrasound images. In some embodiments, generating one or more probe movements comprises computing a confidence or probability that a generated probe movement will improve a clinical quality of acquired images. In some embodiments, guidance instructions prompt a user to make a determined movement determined to have a highest confidence or probability of improving clinical image quality compared to alternate generated movements.

In some embodiments, guidance instructions comprise a plurality of generated movements. In some embodiments, a plurality of generated movements comprises movements corresponding to different sub-views. In some embodiments, a plurality generated movements comprises alternate movements corresponding to a single sub-view. In some embodiments, a guidance instructions further comprise an indication of a computed confidence or probability of an alternate movements corresponding to a single sub-view.

In some embodiments, at least one sub-view comprises a plurality of sub-views, a plurality comprising standard canonical views and/or non-standard views indicative of a target feature within a target volume of a subject. In some embodiments, standard canonical views and non-standard views comprise both on- and off-axis views.

In some embodiments, non-standard views comprise clinically useful information despite an overall clinical quality of an optimal image of a non-standard view being lower than a standard view (e.g. an on-axis, canonical view) of a similar imaging target. In some embodiments, guidance instructions are provided in real time. In some embodiments, guidance instructions comprise generated movements expected to direct a user to an optimal probe position for a selected sub-view of a protocol.

In some embodiments, guidance instructions comprise generated movements expected to direct a user to an optimal probe position for a sub-view which is most proximate to a current probe position.

In some embodiments, guidance comprises a graphical representation of each probe movement, an audio representation of said probe movement, a haptic representation of said movement, or any combination thereof. In some embodiments, probe movements comprises rotation, translation, tilting, rocking, pressing, or any combination thereof. In some embodiments, visual indicators, said audio indicators, said haptic indicators, or any combination thereof are configured to convey information regarding said confidence or probability of improving clinical image quality for each of said generated probe movements. In some embodiments, at least one visual indicator comprises a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof.

In some embodiments, a brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, any of the methods described herein can comprise providing instructions for improving clinical image quality using patient instructions, ultrasound scan system settings, or both. In some embodiments, instructions comprise patient breathing or body position. In some embodiments, ultrasound scan system settings comprises scan depth, gain, or both. In some embodiments, instructions are not identified based on a threshold correlated with image quality.

In some embodiments, ultrasound imaging system is a portable ultrasound imaging system. In some embodiments, an ultrasound imaging system is configured for performing echocardiography.

In some embodiments, any of the methods described herein can comprising receiving one or more additional ultrasound images acquired through said ultrasound imaging system after displaying said guidance. In some embodiments, any of the methods described herein can comprise analyzing said at least a subset of said one or more ultrasound images or said one or more additional ultrasound images to determine clinical image quality of a video image clip.

In some embodiments, an imaging workflow of any of the methods described herein can comprise at least one of automatic image saving, best clip saving, automatic image labelling, automatic diagnostic measurements and/or combinations thereof. In some embodiments, an imaging target comprises a feature of a heart of a subject and the automatic diagnostic measurement is a measurement related to cardiac function. In some embodiments, a measurement related to cardiac function comprises an image-derived EKG or an ejection fraction.

In some embodiment, any of the methods described herein can comprise automatically saving multiple instances of the same canonical view and/or the same sub-view based at least partially on detection of diagnostic differences between the multiple instances. In some embodiments, any of the methods described herein can comprising automatically saving the best image clips of the multiple instances and/or automatically labeling image clips with a corresponding sub-view.

In some embodiments, automatic labeling can comprise labeling a sub-view with an identifier of whether or not a sub-view corresponds to a standard view (e.g. an on-axis canonical view). In some embodiments, any of the methods described herein can comprise alerting a user to a need for acquisition of a plurality of non-standard views based on a selected diagnostic procedure.

In some embodiments, any of the methods described herein can comprise alerting a user incidental proximity to a known sub-view, and determining a minimum amount of frames and/or scan time on that sub-view is required for diagnosis and has not yet been achieved, notifying a user that more dwell time is needed to add an incidental sub-view to the study. In some embodiments, any of the methods described herein can comprise automatically providing guidance instructions to a user to acquire a sub-view detected by an imaging probe based on detection that a user has dwelled in a position proximate to a sub-view for longer than a threshold period of time and/or threshold number of frames.

In some embodiments, guidance instructions comprise providing a quality meter to the user based on the clinical quality of a corresponding sub-view. In some embodiments, any of the methods described herein can comprise providing a user with a real-time output of acquisition status (e.g. saving and/or detection of required sub-views) for a selected diagnostic procedure. In some embodiments, a current position and/or an optimum position is a current probe pose and/or an optimum probe pose. In some embodiments, a probe position comprises a location (e.g. translation coordinates with respect to a reference point) and/or an orientation (e.g. a rotation relative to a reference point).

In some embodiments, any of the methods described herein can comprise rendering a three-dimensional surface of a target feature of a subject wherein training of a machine learning model is performed without use of three-dimensional training images. In some embodiments, a received one or more ultrasound images are received from an ultrasound probe of an ultrasound system wherein the probe uses about 5000 transmit pulses per second or less for image acquisition.

In another aspect, described herein are ultrasound systems comprising at least one processor, a memory, and a computer executable instructions that, when executed by the at least one processor, causes the processor to perform any of the methods described herein.

In another aspect, described herein are non-transitory computer-readable storage media encoded with instructions that, when executed by a processor, causes the processor to perform any of the methods described herein.

In another aspect, described herein are methods of training a machine learning algorithm to evaluate ultrasound image quality and/or determine guidance instructions for ultrasound image acquisition. In some embodiments, the methods comprise annotating a plurality of ultrasound images or ultrasound image clips of a plurality of sub-views of target structures of a subject with clinical quality information and/or ultrasound probe position information, the sub-views comprising both canonical views and non-canonical views, the plurality of ultrasound images or ultrasound image clips comprising both optimal and non-optimal images for each sub-view. In some embodiments, the methods comprise submitting the plurality of annotated ultrasound images or ultrasound image clips to a machine learning algorithm configured to classify non-annotated ultrasound images based on a computed clinical quality and/or a computed ultrasound imaging probe position.

In some embodiments, the methods comprise annotating a plurality of ultrasound images or ultrasound image clips of a plurality of sub-views of a target volume of a subject with clinical quality information and/or ultrasound probe position information, the plurality of sub-views comprising a sufficient number of alternate sub-view points of the target volume to construct a representation of a three-dimensional structure of the target volume.

In some embodiments, the methods comprise submitting the plurality of annotated ultrasound images or ultrasound image clips to a machine learning algorithm. In some embodiments, the methods comprise constructing the three-dimensional representation of the target volume at least in part using the machine learning algorithm. In some embodiments, the methods comprise configuring the machine learning algorithm to classify non-annotated ultrasound images based on a computed clinical quality and/or a computed ultrasound imaging probe position. In some embodiments, the training methods can comprise training a machine learning algorithm for use in any of the methods described herein.

In some embodiments of any of the methods described herein, the plurality of sub-views comprise at least 10, at least 20, at least 30, at least 50, at least 100, at least 200, or at least 1000 different sub-views.

In some embodiments of any of the methods described herein, the plurality of sub-views comprise at least 50 different sub-views.

In one aspect described herein are methods for guiding an ultrasound imaging procedure. In some embodiments, the methods can comprise receiving one or more ultrasound images acquired through an ultrasound imaging system. In some embodiments, the methods can comprise evaluating said one or more ultrasound images using a trained machine learning model to determine a difference between current probe position and an optimal probe position. In some embodiments, the methods can comprise calculating a confidence or probability of improving clinical image quality for each of a plurality of probe movements for reducing said difference between said current probe position and said optimal probe position. In some embodiments, the methods can comprise providing guidance for said plurality of probe movements based on said confidence or probability of improving clinical image quality.

In some embodiments, said guidance comprises a graphical representation of said plurality of probe movements, audio representation of said plurality of probe movements, haptic representation of said plurality of probe movements, or any combination thereof. In some embodiments, said plurality of probe movements comprises rotation, translation, tilting, rocking, pressing, or any combination thereof. In some embodiments, said graphical representation comprises visual indicators for said plurality of probe movements, wherein said audio representation comprises audio indicators for said plurality of probe movements, wherein said haptic representation comprises haptic indicators for said plurality of probe movements, or any combination thereof.

In some embodiments, said visual indicators, said audio indicators, said haptic indicators, or any combination hereof are provided simultaneously. In some embodiments, said visual indicators, said audio indicators, said haptic indicators, or any combination hereof are provided in real-time without time delay. In some embodiments, said visual indicators, said audio indicators, said haptic indicators, or any combination thereof are configured to convey information regarding said confidence or probability of improving clinical image quality for each of said plurality of probe movements.

In some embodiments, at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof.

In some embodiments, said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, the methods can further comprise providing instructions for improving clinical image quality using patient instructions, ultrasound scan system settings, or both. In some embodiments, said patient instructions comprise patient breathing or body position. In some embodiments, said ultrasound scan system settings comprises scan depth, gain, or both. In some embodiments, said instructions are not identified based on a threshold correlated with image quality. In some embodiments, said guidance is provided in real-time without delay based on a time filter or thresholding. In some embodiments, said confidence or probability of improving clinical image quality for each of said plurality of probe movements is independently calculated.

In some embodiments, at least a subset of said plurality of probe movements contradict each other. In some embodiments, said subset of said plurality of probe movements correspond to movements that cannot be performed simultaneously. In some embodiments, said subset of said plurality of probe movements contradict each other based at least on similar calculated confidence or probability of improving clinical image quality. In some embodiments, said ultrasound imaging system is a portable ultrasound imaging system. In some embodiments, said ultrasound imaging system is configured for performing echocardiography.

In some embodiments, the methods can further comprise receiving one or more additional ultrasound images acquired through said ultrasound imaging system after displaying said guidance. In some embodiments, the methods can further comprise analyzing said at least a subset of said one or more ultrasound images or said one or more additional ultrasound images to determine clinical image quality.

In some embodiments, methods described herein can comprise receiving one or more ultrasound images acquired through an ultrasound imaging device. In some embodiments, methods described herein can comprise evaluating said one or more ultrasound images using a trained machine learning model to determine a difference between a current ultrasound probe position and an optimal ultrasound probe position. In some embodiments, methods described herein can comprise determining a clinical image quality of said one or more ultrasound images based at least on said difference between said current ultrasound probe position and said optimal ultrasound probe position. In some embodiments, methods described herein can comprise identifying a plurality of possible probe movements for reducing said difference between said current probe position and said optimal probe position. In some embodiments, methods described herein can comprise calculating a confidence or probability of improving clinical image quality for each of said plurality of possible probe movements. In some embodiments, methods described herein can comprise providing guidance for said plurality of possible probe movements based on said confidence or probability of improving clinical image quality.

In some embodiments, said guidance comprises a graphical representation of said plurality of probe movements, audio representation of said plurality of probe movements, haptic representation of said plurality of probe movements, or any combination thereof. In some embodiments, said plurality of possible probe movements comprises rotation, translation, tilting, rocking, pressing, or any combination thereof. In some embodiments, said graphical representation comprises visual indicators for said plurality of probe movements, wherein said audio representation comprises audio indicators for said plurality of probe movements, wherein said haptic representation comprises haptic indicators for said plurality of probe movements, or any combination thereof. In some embodiments, said visual indicators, said audio indicators, said haptic indicators, or any combination hereof are provided simultaneously. In some embodiments, said visual indicators, said audio indicators, said haptic indicators, or any combination hereof for said plurality of possible probe movements are provided in real-time without time delay.

In some embodiments, said visual indicators, said audio indicators, said haptic indicators, or any combination thereof are configured to convey information regarding said confidence or probability of improving clinical image quality for each of said plurality of probe movements. In some embodiments, at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof.

In some embodiments, said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, the methods can further comprise providing instructions for improving clinical image quality using patient instructions, ultrasound scan system settings, or both. In some embodiments, said patient instructions comprise patient breathing or body position. In some embodiments, said ultrasound scan system settings comprises scan depth, gain, or both. In some embodiments, said instructions are not identified based on a threshold correlated with image quality. In some embodiments, said guidance is provided in real-time without delay based on a time filter or thresholding. In some embodiments, said confidence or probability of improving clinical image quality for each of said plurality of possible probe movements is independently calculated.

In some embodiments, at least a subset of said plurality of possible probe movements contradict each other. In some embodiments, said subset of said plurality of possible probe movements correspond to movements that cannot be performed simultaneously. In some embodiments, said subset of said plurality of possible probe movements contradict each other based at least on similar calculated confidence or probability of improving clinical image quality. In some embodiments, said ultrasound imaging device is a portable ultrasound imaging device. In some embodiments, said ultrasound imaging device is configured for performing echocardiography.

In some embodiments, the methods can further comprise receiving one or more additional ultrasound images acquired through said ultrasound imaging device after displaying said guidance. In some embodiments, the methods can further comprise analyzing said at least a subset of said one or more ultrasound images or said one or more additional ultrasound images to determine clinical image quality.

In another aspect described herein are ultrasound systems comprising at least one processor, a memory, and computer executable instructions. In some embodiments, the instructions, when executed by the at least one processor, causes the processor to receive one or more ultrasound images acquired through an ultrasound imaging probe. In some embodiments, the instructions, when executed by the at least one processor, causes the processor to evaluate said one or more ultrasound images using a trained machine learning model to determine a difference between current probe position and an optimal probe position. In some embodiments, the instructions, when executed by the at least one processor, causes the processor to calculate a confidence or probability of improving clinical image quality for each of a plurality of probe movements for reducing said difference between said current probe position and said optimal probe position. In some embodiments, the instructions, when executed by the at least one processor, causes the processor to provide guidance for said plurality of probe movements based on said confidence or probability of improving clinical image quality.

In some embodiments, said guidance comprises a graphical representation of said plurality of probe movements, audio representation of said plurality of probe movements, haptic representation of said plurality of probe movements, or any combination thereof. In some embodiments, said plurality of possible probe movements comprises rotation, translation, tilting, rocking, pressing, or any combination thereof. In some embodiments, said graphical representation comprises visual indicators for said plurality of probe movements, wherein said audio representation comprises audio indicators for said plurality of probe movements, wherein said haptic representation comprises haptic indicators for said plurality of probe movements, or any combination thereof. In some embodiments, said visual indicators, said audio indicators, said haptic indicators, or any combination hereof for said plurality of possible probe movements are provided simultaneously.

In some embodiments, said visual indicators, said audio indicators, said haptic indicators, or any combination hereof for said plurality of possible probe movements are provided in real-time without time delay. In some embodiments, said visual indicators, said audio indicators, said haptic indicators, or any combination thereof are configured to convey information regarding said confidence or probability of improving clinical image quality for each of said plurality of probe movements. In some embodiments, at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof.

In some embodiments, said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, the systems can further comprise providing instructions for improving clinical image quality using patient instructions, ultrasound scan system settings, or both. In some embodiments, said patient instructions comprise patient breathing or body position. In some embodiments, said ultrasound scan system settings comprises scan depth, gain, or both. In some embodiments, said instructions are not identified based on a threshold correlated with image quality. In some embodiments, said guidance is provided in real-time without delay based on a time filter or thresholding. In some embodiments, said confidence or probability of improving clinical image quality for each of said plurality of possible probe movements is independently calculated. In some embodiments, at least a subset of said plurality of possible probe movements contradict each other.

In some embodiments, said subset of said plurality of possible probe movements correspond to movements that cannot be performed simultaneously. In some embodiments, said subset of said plurality of possible probe movements contradict each other based at least on similar calculated confidence or probability of improving clinical image quality. In some embodiments, said ultrasound imaging system is a portable ultrasound imaging system. In some embodiments, said ultrasound imaging system is configured for performing echocardiography.

In some embodiments, the systems can further comprise receiving one or more additional ultrasound images acquired through said ultrasound imaging probe after providing said guidance. In some embodiments, the systems can further comprise analyzing said at least a subset of said one or more ultrasound images or said one or more additional ultrasound images to determine clinical image quality. In some embodiments, ultrasound systems described herein can comprise computer executable instructions that, when executed by the at least one processor, cause the processor to receive one or more ultrasound images acquired through an ultrasound imaging probe. In some embodiments, ultrasound systems described herein can comprise computer executable instructions that, when executed by the at least one processor, cause the processor to evaluate said one or more ultrasound images using a trained machine learning model to determine a difference between a current ultrasound probe position and an optimal ultrasound probe position. In some embodiments, ultrasound systems described herein can comprise computer executable instructions that, when executed by the at least one processor, cause the processor to determine a clinical image quality of said one or more ultrasound images based at least on said difference between said current ultrasound probe position and said optimal ultrasound probe position. In some embodiments, ultrasound systems described herein can comprise computer executable instructions that, when executed by the at least one processor, cause the processor to identify a plurality of possible probe movements for reducing said difference between said current probe position and said optimal probe position. In some embodiments, ultrasound systems described herein can comprise computer executable instructions that, when executed by the at least one processor, cause the processor to calculate a confidence or probability of improving clinical image quality for each of said plurality of possible probe movements. In some embodiments, ultrasound systems described herein can comprise computer executable instructions that, when executed by the at least one processor, cause the processor to display guidance for said plurality of possible probe movements based on said confidence or probability of improving clinical image quality.

In some embodiments, said guidance comprises a graphical representation of said plurality of probe movements, audio representation of said plurality of probe movements, haptic representation of said plurality of probe movements, or any combination thereof. In some embodiments, said plurality of possible probe movements comprises rotation, translation, tilting, rocking, pressing, or any combination thereof. In some embodiments, said graphical representation comprises visual indicators for said plurality of probe movements, wherein said audio representation comprises audio indicators for said plurality of probe movements, wherein said haptic representation comprises haptic indicators for said plurality of probe movements, or any combination thereof.

In some embodiments, said visual indicators for said plurality of possible probe movements are displayed simultaneously. In some embodiments, said visual indicators, said audio indicators, said haptic indicators, or any combination hereof are provided in real-time without time delay. In some embodiments, said visual indicators, said audio indicators, said haptic indicators, or any combination thereof are configured to convey information regarding said confidence or probability of improving clinical image quality for each of said plurality of probe movements.

In some embodiments, at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof. In some embodiments, said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, the systems can further comprise providing instructions for improving clinical image quality using patient instructions, ultrasound scan system settings, or both. In some embodiments, said patient instructions comprise patient breathing or body position. In some embodiments, said ultrasound scan system settings comprises scan depth, gain, or both. In some embodiments, said instructions are not identified based on a threshold correlated with image quality.

In some embodiments, said guidance is provided in real-time without delay based on a time filter or thresholding. In some embodiments, said confidence or probability of improving clinical image quality for each of said plurality of possible probe movements is independently calculated. In some embodiments, at least a subset of said plurality of possible probe movements contradict each other. In some embodiments, said subset of said plurality of possible probe movements correspond to movements that cannot be performed simultaneously. In some embodiments, said subset of said plurality of possible probe movements contradict each other based at least on similar calculated confidence or probability of improving clinical image quality. In some embodiments, said ultrasound imaging system is a portable ultrasound imaging system. In some embodiments, said ultrasound imaging system is configured for performing echocardiography.

In some embodiments, the systems can further comprise receiving one or more additional ultrasound images acquired through said ultrasound imaging probe after providing said guidance. In some embodiments, the systems can further comprise analyzing said at least a subset of said one or more ultrasound images or said one or more additional ultrasound images to determine clinical image quality.

In another aspect, described herein are non-transitory computer-readable storage media encoded with instructions that, when executed by a processor, causes the processor to receive one or more ultrasound images acquired through an ultrasound imaging system. In some embodiments, the instructions, when executed by a processor, causes the processor to evaluate said one or more ultrasound images using a trained machine learning model to determine a difference between current probe position and an optimal probe position. In some embodiments, the instructions, when executed by a processor, causes the processor to calculate a confidence or probability of improving clinical image quality for each of a plurality of probe movements for reducing said difference between said current probe position and said optimal probe position. In some embodiments, the instructions, when executed by a processor, causes the processor to display guidance for said plurality of probe movements based on said confidence or probability of improving clinical image quality.

In some embodiments, said guidance comprises a graphical representation of said plurality of probe movements, audio representation of said plurality of probe movements, haptic representation of said plurality of probe movements, or any combination thereof. In some embodiments, said plurality of possible probe movements comprises rotation, translation, tilting, rocking, pressing, or any combination thereof. In some embodiments, wherein said graphical representation comprises visual indicators for said plurality of probe movements, wherein said audio representation comprises audio indicators for said plurality of probe movements, wherein said haptic representation comprises haptic indicators for said plurality of probe movements, or any combination thereof.

In some embodiments, said visual indicators for said plurality of possible probe movements are displayed simultaneously. In some embodiments, said visual indicators, said audio indicators, said haptic indicators, or any combination hereof are provided in real-time without time delay. In some embodiments, said visual indicators, said audio indicators, said haptic indicators, or any combination thereof are configured to convey information regarding said confidence or probability of improving clinical image quality for each of said plurality of probe movements. In some embodiments, at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof.

In some embodiments, said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, the non-transitory computer-readable storage media can further comprise instructions that, when executed, cause the processor to provide instructions for improving clinical image quality using patient instructions, ultrasound scan system settings, or both. In some embodiments, said patient instructions comprise patient breathing or body position. In some embodiments, wherein said ultrasound scan system settings comprises scan depth, gain, or both. In some embodiments, said instructions are not identified based on a threshold correlated with image quality. In some embodiments, said guidance is provided in real-time without delay based on a time filter or thresholding. In some embodiments, said confidence or probability of improving clinical image quality for each of said plurality of possible probe movements is independently calculated. In some embodiments, at least a subset of said plurality of possible probe movements contradict each other.

In some embodiments, said subset of said plurality of possible probe movements correspond to movements that cannot be performed simultaneously. In some embodiments, said subset of said plurality of possible probe movements contradict each other based at least on similar calculated confidence or probability of improving clinical image quality. In some embodiments, said ultrasound imaging system is a portable ultrasound imaging system. In some embodiments, said ultrasound imaging system is configured for performing echocardiography.

In some embodiments, the non-transitory computer-readable storage media can further comprise instructions that, when executed, cause the processor to receive one or more additional ultrasound images acquired through said ultrasound imaging system after displaying said guidance. In some embodiments, the non-transitory computer-readable storage media can further comprise instructions that, when executed, cause the processor to analyze said at least a subset of said one or more ultrasound images or said one or more additional ultrasound images to determine clinical image quality.

In another aspect, described herein are non-transitory computer-readable storage media encoded with instructions that, when executed by a processor, causes the processor to receive one or more ultrasound images acquired through an ultrasound imaging system. In some embodiments, the instructions, when executed by a processor, causes the processor to evaluate said one or more ultrasound images using a trained machine learning model to determine a difference between a current ultrasound probe position and an optimal ultrasound probe position. In some embodiments, the instructions, when executed by a processor, causes the processor to determine a clinical image quality of said one or more ultrasound images based at least on said difference between said current ultrasound probe position and said optimal ultrasound probe position. In some embodiments, the instructions, when executed by a processor, causes the processor to identify a plurality of possible probe movements for reducing said difference between said current probe position and said optimal probe position. In some embodiments, the instructions, when executed by a processor, causes the processor to calculate a confidence or probability of improving clinical image quality for each of said plurality of possible probe movements. In some embodiments, the instructions, when executed by a processor, causes the processor to display guidance for said plurality of possible probe movements based on said confidence or probability of improving clinical image quality.

In some embodiments, said guidance comprises a graphical representation of said plurality of probe movements, audio representation of said plurality of probe movements, haptic representation of said plurality of probe movements, or any combination thereof. In some embodiments, said plurality of possible probe movements comprises rotation, translation, tilting, rocking, pressing, or any combination thereof. In some embodiments, said graphical representation comprises visual indicators for said plurality of probe movements, wherein said audio representation comprises audio indicators for said plurality of probe movements, wherein said haptic representation comprises haptic indicators for said plurality of probe movements, or any combination thereof. In some embodiments, said visual indicators for said plurality of possible probe movements are displayed simultaneously. In some embodiments, said visual indicators, said audio indicators, said haptic indicators, or any combination hereof are provided in real-time without time delay.

In some embodiments, said visual indicators, said audio indicators, said haptic indicators, or any combination thereof are configured to convey information regarding said confidence or probability of improving clinical image quality for each of said plurality of probe movements.

In some embodiments, at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof. In some embodiments, said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

In some embodiments, the instructions, when executed further cause the processor to provide instructions for improving clinical image quality using patient instructions, ultrasound scan system settings, or both. In some embodiments, said patient instructions comprise patient breathing or body position. In some embodiments, said ultrasound scan system settings comprises scan depth, gain, or both. In some embodiments, said instructions are not identified based on a threshold correlated with image quality. In some embodiments, said guidance is provided in real-time without delay based on a time filter or thresholding. In some embodiments, said confidence or probability of improving clinical image quality for each of said plurality of possible probe movements is independently calculated.

In some embodiments, at least a subset of said plurality of possible probe movements contradict each other. In some embodiments, said subset of said plurality of possible probe movements correspond to movements that cannot be performed simultaneously. In some embodiments, said subset of said plurality of possible probe movements contradict each other based at least on similar calculated confidence or probability of improving clinical image quality. In some embodiments, said ultrasound imaging system is a portable ultrasound imaging system. In some embodiments, said ultrasound imaging system is configured for performing echocardiography.

In some embodiments, the non-transitory computer-readable storage media further comprises instructions that, when executed, cause the processor to receive one or more additional ultrasound images acquired through said ultrasound imaging system after displaying said guidance. In some embodiments, the non-transitory computer-readable storage media further comprises instructions that, when executed, cause the processor to analyze said at least a subset of said one or more ultrasound images or said one or more additional ultrasound images to determine clinical image quality.

In another aspect, described herein are methods for guiding an ultrasound imaging procedure. In some embodiments, the methods can comprise receiving one or more ultrasound images acquired through an ultrasound imaging system. In some embodiments, the methods can comprise evaluating said one or more ultrasound images using a trained machine learning model to determine a difference between current probe position and an optimal probe position for each of a plurality of different target sub-views. In some embodiments, the methods can comprise calculating a confidence or probability of improving clinical image quality for each of a plurality of probe movements for reducing said difference between said current probe position and said optimal probe position for each of a plurality of different target sub-views. In some embodiments, the methods can comprise providing guidance for said plurality of probe movements based on said confidence or probability of improving clinical image quality for each of said plurality of different target sub-views.

In another aspect, described herein are ultrasound systems comprising at least one processor, a memory, and computer executable instructions that, when executed by the at least one processor, causes the processor to receive one or more ultrasound images acquired through an ultrasound imaging system. In some embodiments the instructions, when executed by the at least one processor, cause the processor to evaluate said one or more ultrasound images using a trained machine learning model to determine a difference between current probe position and an optimal probe position for each of a plurality of different target sub-views. In some embodiments the instructions, when executed by the at least one processor, cause the processor to calculate a confidence or probability of improving clinical image quality for each of a plurality of probe movements for reducing said difference between said current probe position and said optimal probe position for each of a plurality of different target sub-views. In some embodiments the instructions, when executed by the at least one processor, cause the processor to provide guidance for said plurality of probe movements based on said confidence or probability of improving clinical image quality for each of said plurality of different target sub-views.

In another aspect, described herein are non-transitory computer-readable storage media encoded with instructions that, when executed by a processor, cause the processor to receive one or more ultrasound images acquired through an ultrasound imaging system. In some embodiments the instructions, when executed by the processor, cause the processor to evaluate said one or more ultrasound images using a trained machine learning model to determine a difference between current probe position and an optimal probe position for each of a plurality of different target sub-views. In some embodiments the instructions, when executed by the processor, cause the processor to calculate a confidence or probability of improving clinical image quality for each of a plurality of probe movements for reducing said difference between said current probe position and said optimal probe position for each of a plurality of different target sub-views. In some embodiments the instructions, when executed by the processor, cause the processor to provide guidance for said plurality of probe movements based on said confidence or probability of improving clinical image quality for each of said plurality of different target sub-views.

In another aspect, described herein are methods for guiding an ultrasound imaging procedure. In some embodiments, the methods can comprise receiving one or more ultrasound images acquired through an ultrasound imaging system. In some embodiments, the methods can comprise evaluating said one or more ultrasound images using a trained machine learning model to determine a difference between a current ultrasound probe position and an optimal ultrasound probe position for each of a plurality of different target sub-views. In some embodiments, the methods can comprise determining a clinical image quality of said one or more ultrasound images based at least on said difference between said current ultrasound probe position and said optimal ultrasound probe position for each of said plurality of different target sub-views. In some embodiments, the methods can comprise identifying a plurality of possible probe movements for reducing said difference between said current probe position and said optimal probe position for each of said plurality of different target sub-views. In some embodiments, the methods can comprise calculating a confidence or probability of improving clinical image quality for each of said plurality of possible probe movements for each of said plurality of different target sub-views. In some embodiments, the methods can comprise displaying guidance for said plurality of possible probe movements based on said confidence or probability of improving clinical image quality for each of said plurality of different target sub-views.

In another aspect, described herein are non-transitory computer-readable storage media encoded with instructions that, when executed by a processor, cause the processor to receive one or more ultrasound images acquired through an ultrasound imaging system. In some embodiments the instructions, when executed by the processor, cause the processor to evaluate said one or more ultrasound images using a trained machine learning model to determine a difference between a current ultrasound probe position and an optimal ultrasound probe position for each of a plurality of different target sub-views. In some embodiments the instructions, when executed by the processor, cause the processor to determine a clinical image quality of said one or more ultrasound images based at least on said difference between said current ultrasound probe position and said optimal ultrasound probe position for each of said plurality of different target sub-views. In some embodiments the instructions, when executed by the processor, cause the processor to identify a plurality of possible probe movements for reducing said difference between said current probe position and said optimal probe position for each of said plurality of different target sub-views. In some embodiments the instructions, when executed by the processor, cause the processor to calculate a confidence or probability of improving clinical image quality for each of said plurality of possible probe movements for each of said plurality of different target sub-views. In some embodiments the instructions, when executed by the processor, cause the processor to display guidance for said plurality of possible probe movements based on said confidence or probability of improving clinical image quality for each of said plurality of different target sub-views.

In another aspect, described herein are ultrasound systems comprising at least one processor, a memory, and a computer executable instructions that, when executed by the at least one processor, cause the processor to receive one or more ultrasound images acquired through an ultrasound imaging system. In some embodiments the instructions, when executed by the processor, cause the processor to evaluate said one or more ultrasound images using a trained machine learning model to determine a difference between a current ultrasound probe position and an optimal ultrasound probe position for each of a plurality of different target sub-views. In some embodiments the instructions, when executed by the processor, cause the processor to determine a clinical image quality of said one or more ultrasound images based at least on said difference between said current ultrasound probe position and said optimal ultrasound probe position for each of said plurality of different target sub-views. In some embodiments the instructions, when executed by the processor, cause the processor to identify a plurality of possible probe movements for reducing said difference between said current probe position and said optimal probe position for each of said plurality of different target sub-views. In some embodiments the instructions, when executed by the processor, cause the processor to calculate a confidence or probability of improving clinical image quality for each of said plurality of possible probe movements for each of said plurality of different target sub-views. In some embodiments the instructions, when executed by the processor, cause the processor to display guidance for said plurality of possible probe movements based on said confidence or probability of improving clinical image quality for each of said plurality of different target sub-views.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 4B illustrates determination of the current probe pose relative to the idea for the target view. In this example, the AP4 view of a heart is used as the target. The ideal AP4 is obtained by aiming the probe in a particular pose. The gray probe shows the ideal pose, with the dot showing the indicator direction, which matches the dot on panel a.

DETAILED DESCRIPTION

Disclosed herein are platforms, systems, and methods for providing ultrasound guidance comprising multiple instructions for obtaining improved or optimal image quality. The multiple instructions are provided in a manner that addresses technical challenges in AI-based ultrasound guidance.

The improvements disclosed herein capture the knowledge of expert sonographers. Specifically, sonographers understand the anatomical structures or features they see in an ultrasound image as well as the diagnostic quality of the image, and how and where to move the ultrasound probe to acquire the desired imagery based on the current ultrasound imagery. The platforms, systems, and methods disclosed herein utilize machine learning techniques such as deep learning to capture this perceptual ability in order to empower much broader range of clinical users including non-specialists to acquire high-quality ultrasound imaging, particularly for echocardiograms.

Deep learning is a form of machine learning based on artificial neural networks. Deep learning refers to a number of techniques, but common attributes include composing simple computational elements into a layer, composing many layers into deep stacks, and adapting the parameters of the elements using supervised learning.

In order to allow non-expert users to acquire high-quality echocardiograms, the algorithms disclosed herein estimate the positioning of the ultrasound probe and provide real-time guidance based on that estimation for the user to arrive at the ideal positioning that produce desired imagery. In addition, an algorithm or model can be used to grade the quality of the imagery and determine whether it meets diagnostic purposes (which may depend on the type of ultrasound imaging procedure or targeted sub-view) and is therefore suitable for capturing and/or saving for downstream analysis.

Figure 1:
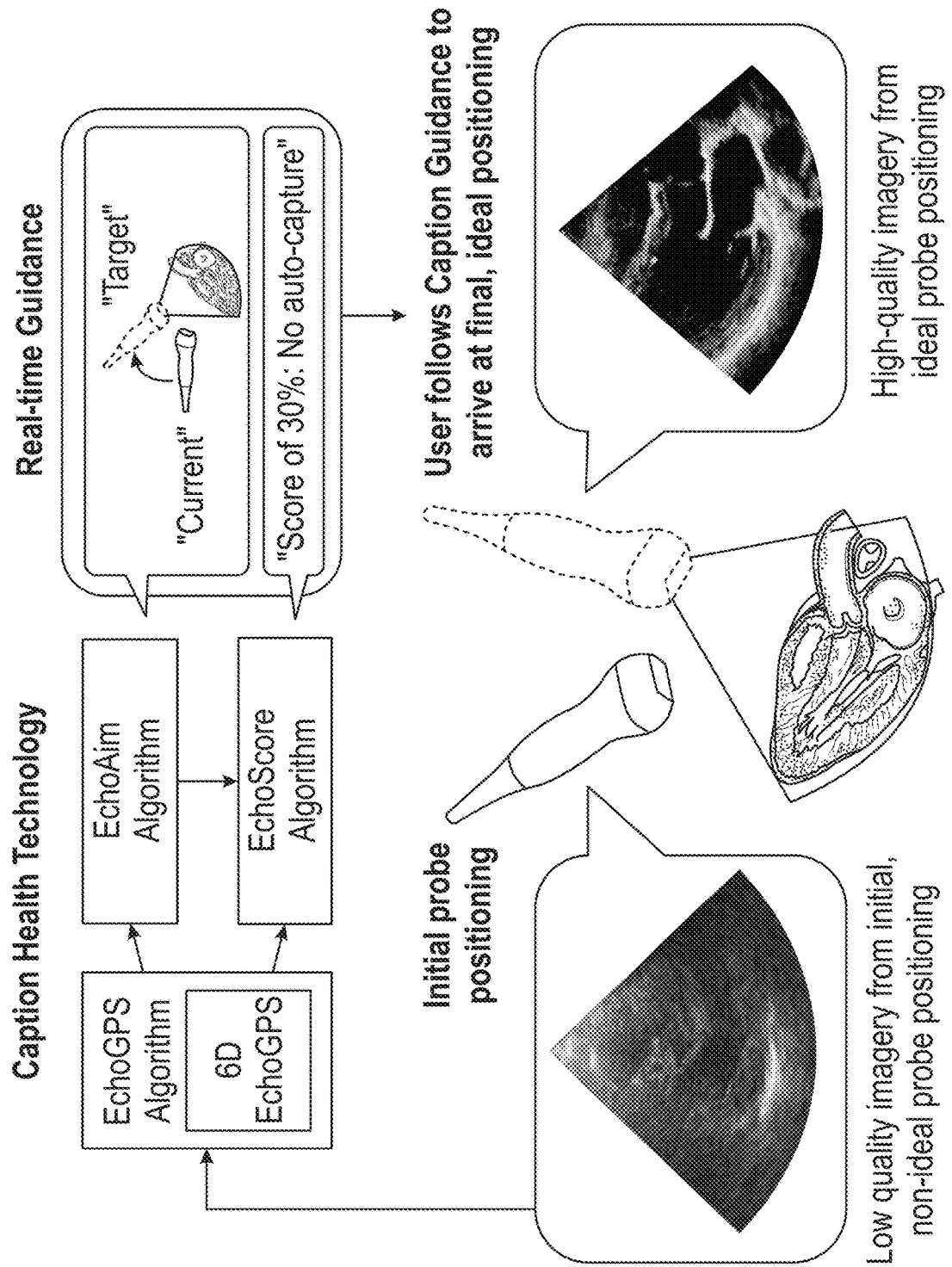
FIG. 1 shows components of a workflow for evaluating ultrasound images using a positioning algorithm ("EchoGPS") utilizing a volume-based classifier ("6D EchoGPS"), a quality algorithm ("EchoScore"), and a guidance algorithm ("EchoAim"). An example guidance workflow ("Caption Guidance") allowing acquisition of high quality echocardiograms is shown. A non-specialist user frequently encounters non-ideal probe positioning. Caption Guidance runs EchoGPS Algorithm to estimate the coordinates of the anatomical structures on input imagery as well as their uncertainties. EchoAim and EchoScore Algorithms then produce real-time guidance. This guidance can be presented to the user via the user interface of Caption Guidance software, and the user can follow the guidance to improve imagery. The user repeats this process to arrive at the final, ideal positioning that produces diagnostic quality echocardiogram, which Caption Guidance may capture automatically.

Accordingly, disclosed herein are platforms, systems, and methods comprising one or more algorithms for evaluating ultrasound images to provide real-time guidance. In some embodiments, the one or more algorithms comprise a probe positioning algorithm configured to estimate probe positioning relative to an ideal anatomical perspective ("probe positioning features") as well as the physical distance between the estimated and ideal probe positioning from the ultrasound imagery. The output generated by the probe positioning algorithm may be analyzed or utilized by one or more downstream algorithms. In some embodiments, the one or more algorithms comprise a scoring algorithm configured to generate a computational output such as a metric or score based on the probe positioning distance. The scoring algorithm may convert the probe positioning distance into a normalized score, for example, that is proportional to the proximity between the estimated probe positioning and the ideal probe positioning, which can be used to provide real-time feedback on the quality or correctness of probe positioning. For example, the normalized score may be utilized for features such as retrospectively saving the best imagery over time and automatically capturing imagery once the score becomes sufficiently high for diagnostic purposes. In some embodiments, the one or more algorithms comprise a guidance algorithm configured to estimate probe manipulations or movements that would improve the geometry of the probe positioning for a given desired canonical sub-view of the anatomy. The guidance algorithm may utilize the probe positioning estimated by the probe positioning algorithm and/or the positioning score calculated by the scoring algorithm. The output of the guidance algorithm can be used to determine the specific instructions to provide to the user for how to manipulate the probe. These algorithms operate together to provide real-time guidance to ultrasound the user: even a non-specialist user may follow prescriptive guidance and optimize the positioning score to get a point where the diagnostic quality is achieved and the corresponding ultrasound images are captured automatically. FIG. 1 provides an overview of an illustrative and non-limiting embodiment of this workflow. The non-specialist user frequently encounters non-ideal probe positioning. The ultrasound guidance workflow can include a positioning algorithm ("EchoGPS") utilizing a trained machine learning algorithm which understands a 3D structure of an imaging target to estimate the positioning relative to the ideal, based on input imagery. A scoring algorithm ("EchoScore") may be used to calculate a quality metric or score based on the positioning generated by the positioning algorithm. A guidance algorithm ("EchoAim") can then be used to produce probe navigational guidance for reducing the difference between the current positioning of the probe and the ideal positioning. Algorithms can then produce real-time guidance. This guidance can be presented to the user via a user interface in real-time to provide timely guidance for the user to improve image quality. This process may be repeated to arrive at the final, ideal positioning that produces diagnostic quality echocardiogram. In some cases, images that successfully achieve diagnostic quality are captured automatically during this process.

Diagnostic Image Quality

A particular challenge in ultrasound medical imaging is accurately determining what probe pose or movement will result in a clinical or diagnostic quality image. As used herein, an image quality (e.g. diagnostic quality or clinical quality) may be used to refer to one or more aspects of the quality of an image. In some embodiments, image quality is in reference to an image that can be viewed by a trained expert or a machine learning tool in a way that anatomy is identified and a diagnostic interpretation can be made. In some embodiments, image quality is in reference to an image in which the targets are displayed in a clear and well-defined manner, for example, where extraneous noise or clutter is minimal, the grayscale display shows subtle variations of tissue type and texture, blood flow signals are clear and distinct, frame rates are high, providing accurate depiction of tissue or blood flow movement, borders between tissue types or blood flow and vessel or other structures are well resolved, ultrasound artifacts such as grating and side lobes are minimized, acoustic noise is absent, places to make measurements in the image are obvious and distinct, or any combination thereof depending on the nature of the ultrasound exam. In some embodiments, image quality is in reference to an image that contains the necessary anatomical targets to represent a standard diagnostic sub-view or a non-standard sub-view which contains clinically useful information. For example, an Apical Four Chamber sub-view of the heart should show the apex of the heart, the left and right ventricles, the myocardium, the mitral and tricuspid valves, the left and right atria, and the interatrial septum. As another example, a long axis sub-view of the carotid artery at the bifurcation should show the common, external, and carotid artery and the carotid bulb. In some embodiments, image quality is in reference to an image in which a diseased condition, abnormality, or pathology is well visualized. For example, medical images may be labeled by cardiologists, radiologists or other healthcare professionals according to whether they are considered to have a well visualized diseased condition, abnormality, or pathology, and then used to train a machine learning algorithm to differentiate between images based on image quality.

In some embodiments, image quality means that some combination of these aforementioned characteristics is present. Effective navigational guidance will need to be provided to ensure the captured ultrasound image satisfies the combination of these image quality characteristics necessary to yield an overall clinical or diagnostic quality image because, in ultrasound imaging, patient presentations can present challenges to obtaining high-resolution, low-noise images. It can be particularly challenging, for example, when trying to evaluate blood flow in the kidney of an obese agent, to get a strong enough blood flow Doppler signal because the kidney is so deep underneath fatty tissue. In a patient who has been a long-term smoker, lung disease can make it very difficult to obtain high quality cardiac images. These conditions are extremely common, and in such situations, image quality can mean an image that may be sub-optimal as far as noise and resolution, but still provides enough information for a diagnosis to be made. In a similar way, patient presentations and pathologies can make it impossible to obtain sub-views that show all the anatomical components of a standard, canonical image. For example, a technically difficult cardiac patient may make it impossible to get an Apical Four Chamber sub-view with all four chambers well defined, but if some images show, say, the left ventricle well, this can be considered a quality image because many critical diagnostic conclusions can be drawn from only that.

In some embodiments, the anatomical sub-views used in the present disclosure include one or more of a probe position or window, an imaging plane, and a region or structure being visualized. Examples of probe position or window include parasternal, apical, subcostal, and suprasternal notch. Examples of imaging plane include long-axis (LAX), short-axis (SAX), and four-chamber (4C). Examples of the region or structure being visualized include two-chamber, aortic valve, mitral valve, etc. For example, the anatomical sub-views can include parasternal long-axis (LV inflow/outflow), RV inflow+/−RV outflow, parasternal short-axis (aortic valve level, mitral valve level, papillary muscle level, apical LV level), apical four-chamber, apical five-chamber, apical two-chamber, apical three-chamber, subcostal four-chamber sub-view, subcostal short-axis and long-axis, suprasternal long-axis (aortic arch) and suprasternal short-axis (aortic arch).

Ultrasound Guidance Instructions

Disclosed herein are platforms, systems, and methods that provide navigational guidance to users to instruct them how to hold and manipulate the probe in order to get diagnostic or clinical quality images sufficient to make medical and/or diagnostic decisions. The conditions and the nature of ultrasound imaging create various problems for navigation assistance ultrasound technologies. Methods for providing guidance to users for ultrasound acquisition are faced with the image quality challenges listed above in order to provide high quality images sufficient to draw medical diagnoses or conclusions. One technical challenge is the guidance must function in real-time at sufficiently high frame rates to enable effective navigational guidance to the user (e.g. as high as 60 frame per second or higher). Another challenge is the guidance needs to function effectively while the user is moving the probe in a variety of manners and directions such that the image is rapidly changing. Another challenge that frequently arises is providing effective navigational guidance despite the ambiguity of suboptimal images acquired during the ultrasound imaging procedure, where a human expert or a machine learning tool may not always be able to recognize the structures. There may often be multiple movements that a user should make in order to get a quality image of a particular target. For example, the user may be trying to image the aortic valve from the parasternal window. The movements they need to make to get a good image might include rotating the probe counterclockwise, sliding the probe up on the patient, and rocking the probe towards the index marker on the probe. Providing instructions on all of these possible movements, in a coherent and usable manner, when the user is at the same time moving the probe in correct or incorrect ways is difficult. This difficulty is amplified by the fact that the movement guidance instructions estimated by a guidance algorithm inevitably contain some uncertainly and error. There may even at times be multiple legitimate guidance calculations that are estimated simultaneously even though they contradict one another. For example, a particular structure or sub-view may be achieved by rotating the probe clockwise, or it may be achieved by rotating the probe counter-clockwise. Whether one path is better than another can change rapidly based on such things as, patient breathing, patient movement, heart motion, blood vessel pulsations, or the user moving the probe. Collectively, these challenges significantly reduce the effectiveness of ultrasound navigation methods.

Accordingly, the platforms, systems, and methods disclosed herein provide navigational guidance to users for probe movement and/or manipulation for obtaining diagnostic or clinical quality images. In particular, in certain embodiments, the navigational guidance is improved through an omnidirectional guidance feature that compensates and/or mitigates potentially contradictory and/or fluctuations in navigational guidance that can arise due to any of the above-mentioned technical challenges. One advantage provided by the present disclosure is the provisioning of navigational guidance when there are multiple movements at one time that can be made. Another advantage is providing navigational guidance when the image is rapidly changing because of constant and unpredictable patient movement, tissue movement, probe movement by the user, or any combination thereof. Another advantage is providing navigational guidance when there is substantial uncertainty or the navigation tool cannot fully overcome uncertainty or erroneous movement instructions. Another advantage is providing real-time probe movement instructions to users in a manner that addresses these problems but produces user feedback that is smooth, logical, and not distracting or confusing.

In some cases, when multiple instructions may be needed, the most important movement instruction (e.g., having the highest likelihood or probability of improving image quality) is selected and provided to the user. The selection of which one or perhaps one or two, of several viable movements should be displayed to the user can be determined by looking at a time sequence of ultrasound frames, and determining which guidance movement instruction occurs most frequently. For example, the device could collect two seconds worth of image frames at a frame rate of 60 fps for a total of 120 frames. If the "Rotate Clockwise" instruction is determined to be the appropriate movement guidance instruction 100 times and the "Slide Medially" instruction is calculated 20 times, the "Rotate Clockwise" instruction would be displayed as the instruction that was calculated most frequently within the time frame. This time frame can be a certain time duration during which a plurality of movement instructions are evaluated to determine the specific instruction to be displayed. Alternatively, the plurality of movement instructions may be evaluated based on a certain number of the most recent frames. For example, the most important instruction may be selected based on evaluation of the most recent plurality of movement instructions such as the most recently captured 120 image frames. The duration and/or the number of frames used for this selection of the most important instruction can be set at a number that provides satisfactory smoothing of the guidance instructions. Then, once the most important probe movement has been made, the next most important movement instruction may be provided to the user (e.g., via a user interface such as a digital display integrated into a handheld ultrasound device or on a separate display communicatively coupled to the ultrasound device), and the process is repeated until a quality image is obtained.

In some cases, when the image is rapidly changing because of constant and unpredictable patient movement, tissue movement, or probe movement by the user, a specific movement instruction is provided through the user interface for a minimum duration. Without this, different instructions could flash up on the screen many times a second, or be provided audibly or through haptic feedback, thereby producing confusing, distracting, and unusable feedback to the user. In some cases, the specific movement instruction may be configured to occur over a set period of time or a minimum period of time (e.g., a minimum threshold). In some cases, the movement instruction occurs over some number of sampling instances.

In some cases, to address the problem that the navigation tool cannot fully overcome uncertainty or erroneous movement predictions, a threshold measurement is used to only display movements instructions to the user that pass the threshold. For example, a certain threshold number or threshold duration of a particular movement instruction for improving diagnostic or clinical image quality may be required (out of a total number or total duration of sampling instances) before the instruction is displayed to the user in order to avoid confusing the user. Therefore, to provide user feedback that is smooth, logical, and not distracting or confusing, one approach is to use a threshold to select a single movement most likely to overcome an image quality deficiency, require that such a movement meet a threshold amount or value to be passed to the user, not provide other movement possibilities to the user simultaneously, and apply a time filter (e.g., a minimum time duration) or number filter (e.g., a minimum number of images) to ensure a defined movement has been identified and is persisting. The navigation software has determined that the user is relatively close to an acceptable image. The user is informed of this by the quality meter in the upper left corner of the screen. The two triangular tick marks on the meter represent a reliably diagnostic image. The multiple horizontal bars approach the tick marks and change colors (e.g., turn green) to indicate that the image is good and close to reliably diagnostic. The probe movement instruction that has been determined to best most appropriate to improve the image is that the user should rotate the probe counter clockwise slowly. This is displayed as a text message and in the form of an icon. Note that just one instruction is provided to the user at a time. In this implementation, the instruction is designed to change only after a probability threshold and timing filter are met.

This method may arrive at this single instruction by using an image processing or machine learning model that compares the current image to a desired image. It may use an anatomical model of the spatial relationship of the deficient current image to the desired optimal image to determine probe movement instructions. It may use a model that correlates the current deficient image probe position to the probe position of the desired optimal image to determine probe movement instructions. These estimates will produce multiple possible instructions. These include different movement types that are compatible with getting a good image, but can also include contradictory movements that the model can't disambiguate. A threshold is applied to select one instruction that achieves the highest confidence level of the various possibilities returned by an algorithm. This class of instruction then is held for presenting to the user pending a continual monitoring of the image to confirm over some number of instances, such as a frame, number of frames, time period, or number of sampling instances, that the instruction is accurate. Feedback can be visual, such as a text display, graphical icon, or audible, or haptic.

The current navigation solutions are insufficient to address the particular technical problems recognized in the instant disclosure because they only provide one instruction at a time or only a limited number of instructions, which can result in certain technical challenges in providing suitable instructions to the user. The limitation on instructions shown to the user may utilize a threshold to decide which of one or a limited number of instructions to display to the user. There may be a delay in displaying instructions to users because a time filter is used to avoid rapidly flashing different instructions to users. If multiple instructions are provided without using thresholding, or instructions without using time filters, then the feedback would be unusable or difficult to interpret. For example, there would be rapidly appearing and disappearing or changing text messages or graphic icon changes (or other guidance instructions/indications) as the probe is moved and captures numerous images, some of which are of low quality and therefore produce low quality calculated navigational guidance instructions.

By contrast, the platforms, systems, and methods disclosed herein provide for improved navigational guidance that overcomes the limitations of previous approaches. In one aspect, the guidance utilizes a threshold that looks for a probe movement instruction to occur over a period of time or a number of computations to select among multiple alternatives that may or may not be used, or may be adjustable. The guidance for probe navigation or movement instructions can be instantaneously provided to the user in real-time as they are operating the ultrasound probe. In some cases, the guidance for multiple probe movements are provided simultaneously. The guidance may include feedback or additional information on probe movement instructions that have differing probabilities of being accurate, even ones that contradict each other. The guidance may be presented via a graphical method that minimizes distracting visual information. The graphical display may incorporates a plurality of movement instructions in an intuitive manner. In some cases, the display uses one of several methods to inform the user of the confidence level or importance of the various movements. For example, the confidence level or importance of one or more movements (e.g. corresponding to improvement in image quality expected to be obtained through the movement) can be graphically represented with increasing or decreasing screen brightness (e.g. increased brightness for higher confidence movements), colors (e.g. red for low, yellow for intermediate, and green for high likelihood of being accurate), or it could be with different types of graphical filling or markers (e.g. the graphical density of filling in an icon). Different parts of the guidance graphic could pulse or flash to indicate movement. Colors and icons could be of varying transparency and these parameters may change as the user moves to the correct position, for example, the colors and icons could solidify as the probe approaches the correct position. In some cases, the navigational guidance comprises instructions or contextual information not strictly related to probe movements, such as patient breathing or body position instructions, or ultrasound system setting instructions such as depth or gain. In some cases, the instructions do not have thresholds correlated with image quality.

In some cases, the ultrasound navigation device is configured to provide many types of probe movement instructions, and other scanning instructions. Examples of instructions include such pose changes as: rotate the probe clockwise or counterclockwise, slide (translate) the probe up towards the patient's head, down towards the patient's feet, laterally towards the patients side, medially towards the patient's midline. Instructions can include telling the user to tilt the ultrasound beam up towards the head, down towards the feet, laterally or medially. This instruction can also be provided in relationship to the back or "tail" of the physical probe. For example if the instruction calls for the beam to be aimed up towards the head, the instruction could be to move the probe tail down. In some cases, the probe comprises an index marker (e.g., on one side). This can correspond to a graphical display on one side of the image on the screen. Accordingly, the user can be instructed to rock the probe towards this marker or away from this marker. The user can also be instructed to apply more or less pressure to the probe as it is pressed against the patient.

Other instructions not strictly related to probe position may be provided, including ultrasound acquisition parameters such as changing the scanning depth of field setting or increasing or decreasing image gain. In some cases, patient instructions are provided, for example, instructions for the patient change their breathing pattern or to move or adjust the patient's body or body positioning.

Figure 5:
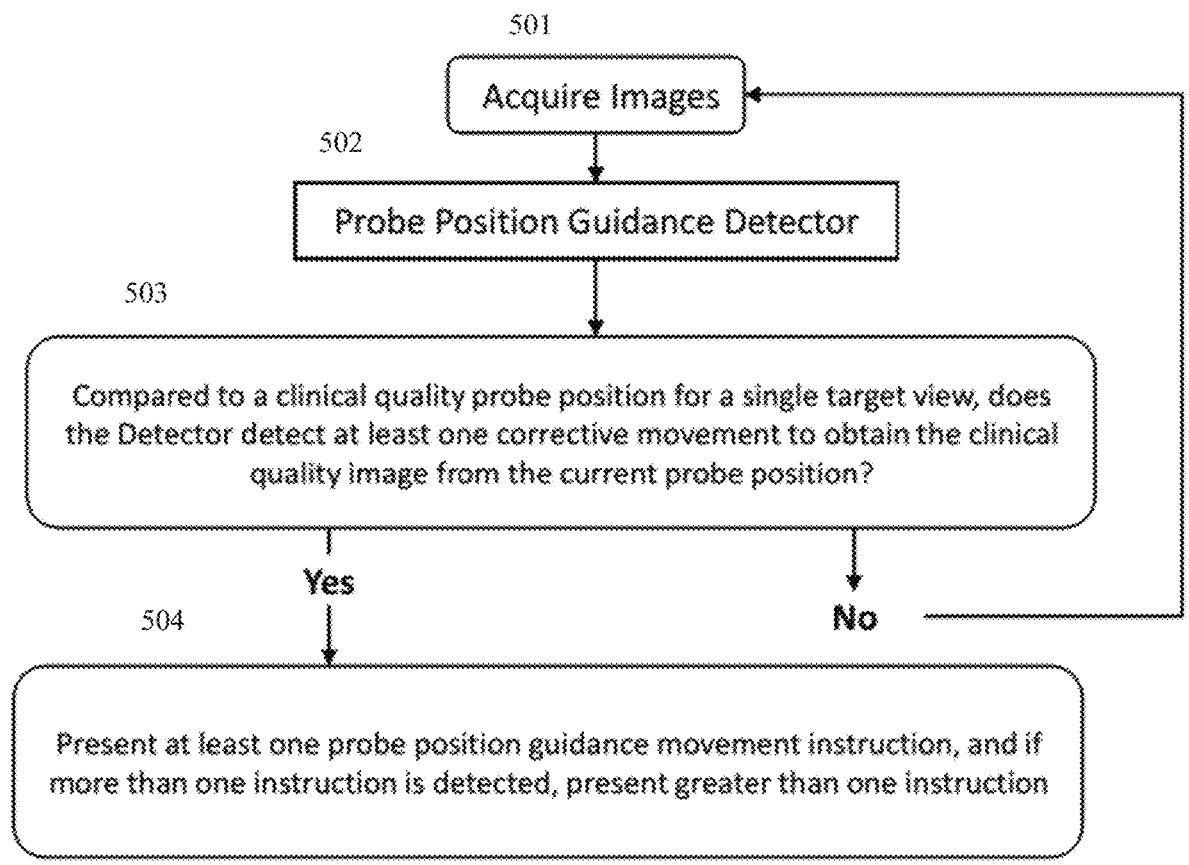
FIG. 5 provides a flow chart of a process for presenting one or more probe movement instructions for achieving a single target sub-view.
Figure 6:
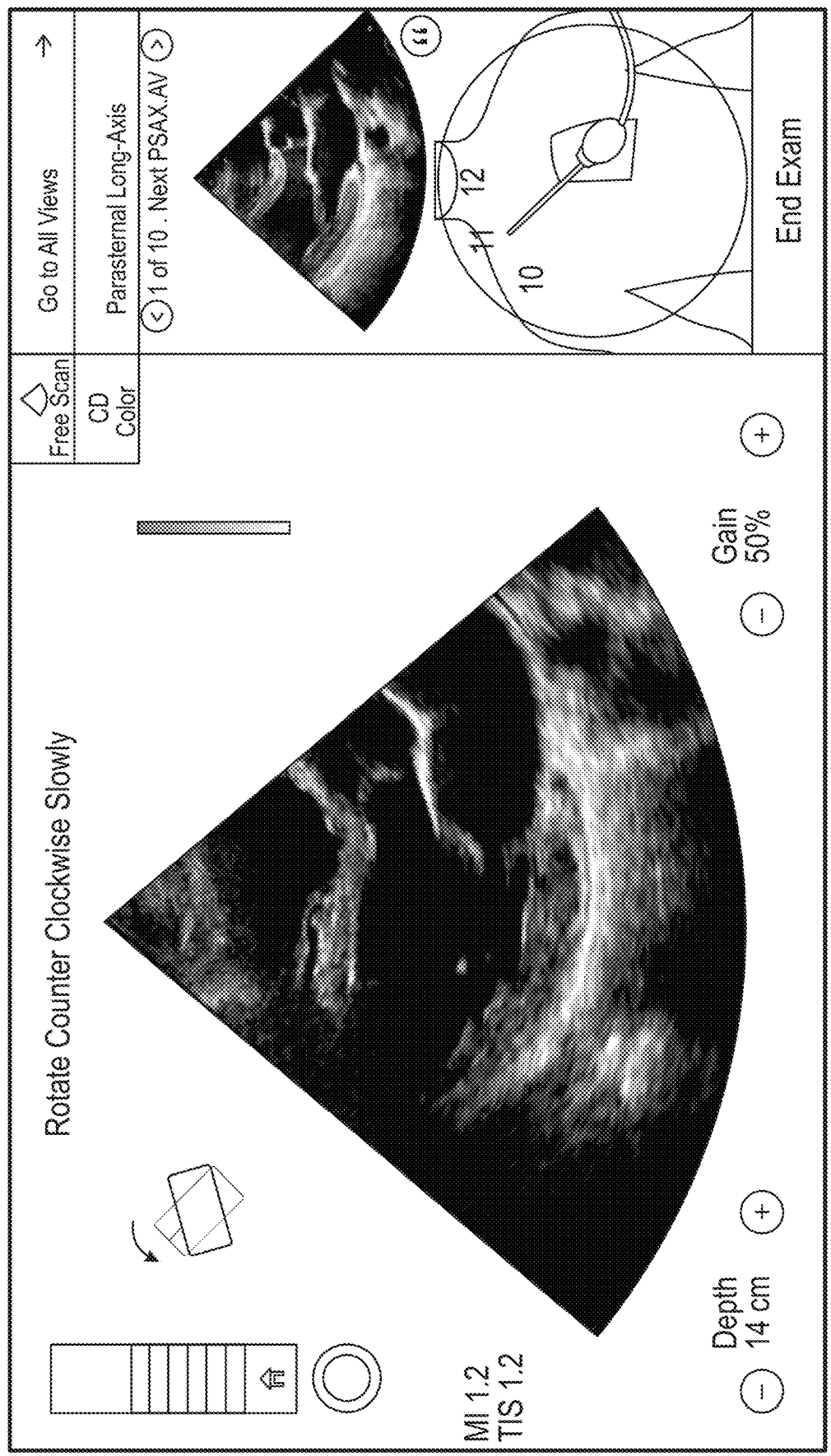
FIG. 6 shows an example of a user interface which provides both a quality indicator and guidance instructions to a proximate sub-view (for example, the standard canonical parasternal long-axis sub-view).
Figure 7:
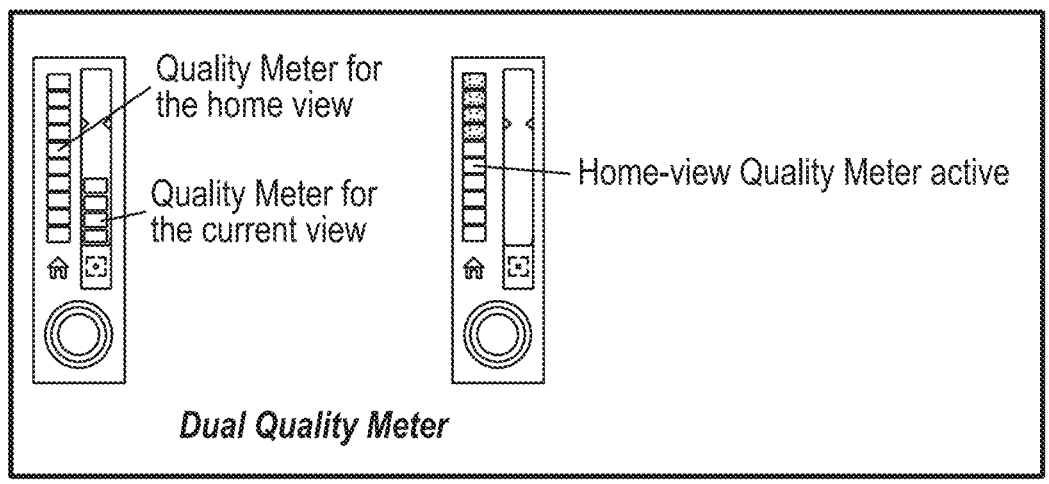
FIG. 7 shows an example of a user interface for providing a quality meter for more than one sub-view. When scanning for subsequent views within an acoustic-window series, two Quality Meters appear. This dual-meter shows the home view to the left and the current view to the right. An example implementation of methods and systems described herein (Caption AI) displays the dual Quality Meter to help reorient the operator, where going back to the home view may be helpful in getting to the current view. For example, in getting an Apical 2-Chamber view of the heart, it may be helpful to go back to the Apical 4-Chamber view, establish a good image for that view, and then rotate from there to obtain an Apical 2-Chamber view.

FIG. 5 shows an illustrative flow chart for one or more probe position guidance movement instructions for achieving one or more target sub-views. After image acquisition by the ultrasound probe 501, the probe position guidance is determined or detected 502. Compared to a clinical quality probe position for a one or more target sub-view, it is determined whether the probe position guidance detector detects or determines at least one corrective movement to obtain an improved quality image compared to the current probe position 503. Next, the one or more probe position guidance movement instructions that are determined in the previous step 503 are presented to the user to provide navigational guidance of the probe for the one or more target sub-view 504.

Additional information may be added, including non-movement instructions. For example, an icon may represent patient breathing state or pressure on the probe against the patient. This additional information could be updated continuously and displayed in real-time as the image analysis module and/or machine learning device detects potential changes the user could make.

Another implementation of this guidance system would be to utilize the movement instruction method and display to provide guidance to multiple anatomical sub-views at once. The dial-like graphical display could be replicated multiple times on the display, one each for a particular sub-view. The algorithm can display the movement instructions for the multiple sub-views simultaneously. This would be impractical using current methods. For example, a user might be scanning a parasternal short axis sub-view of the heart at the mitral valve level. Tilting the beam up could produce an image of the aortic valve, tilting the beam down could produce an image of the left ventricle at the papillary muscle level. Each option could be displayed without causing confusion to the user. This embodiment could be implemented by replicating the movement instruction graphic for each sub-view, or alternatively, it could be implemented by placing a text or icon marker for a sub-view at a position on a single movement instruction graphic. In some cases, one or more of the anatomical sub-views are user selected via the user interface before or during the ultrasound examination. This allows a user to determine the anatomical sub-views for which probe movement or guidance instructions will be provided.

Multiple movements to multiple sub-views can be provided simultaneously. Alternatively, a graphical display could be implemented as a separate movement set of icons or visual indicators produced for each sub-view instead of multiple sub-views sharing the same set of movement icons or visual indicators.

Figure 8:
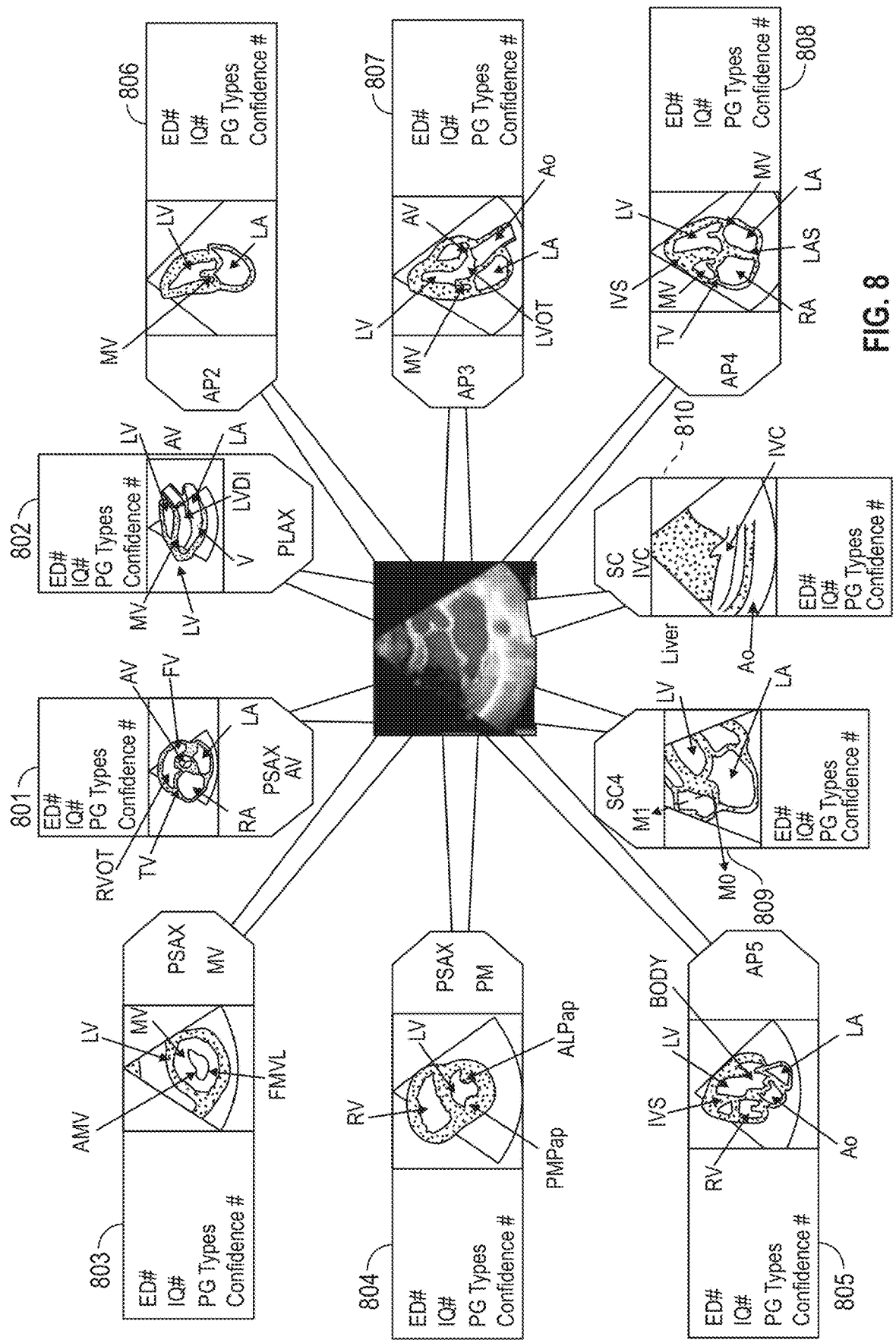
FIG. 8 shows multiple target sub-views for an echocardiograph of a heart.
Figure 9A:
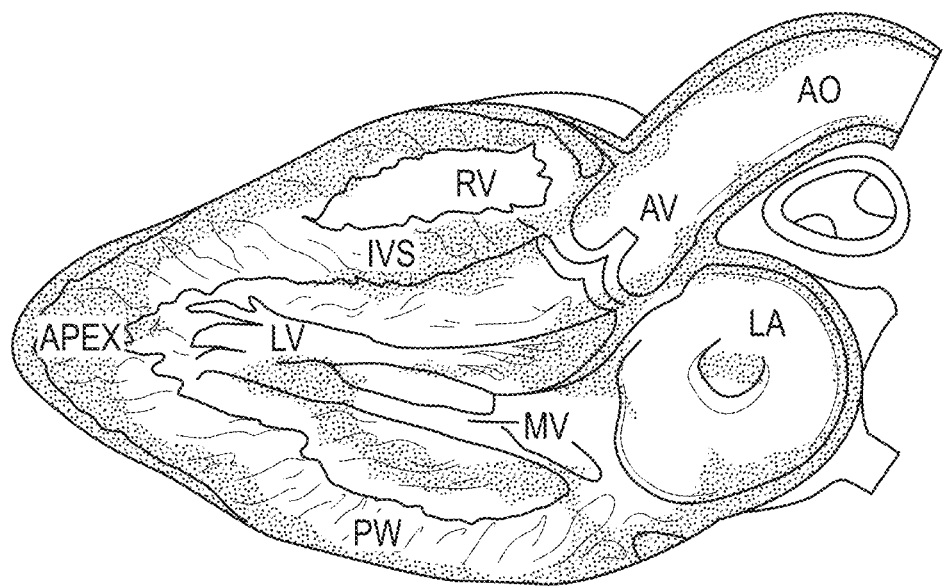
FIG. 9A shows a diagram illustrating an example target of a subject (a heart). Abbreviations in the illustration indicate as follows: RV: Right Ventricle. AV: Aortic Valve. AO: Aorta. LA: Left Atrium. MV: Mitral Valve. PW: Posterior Wall. LV: Left Ventricle. IVS: Interventricular Septum. APEX: Apex.
Figure 9B:
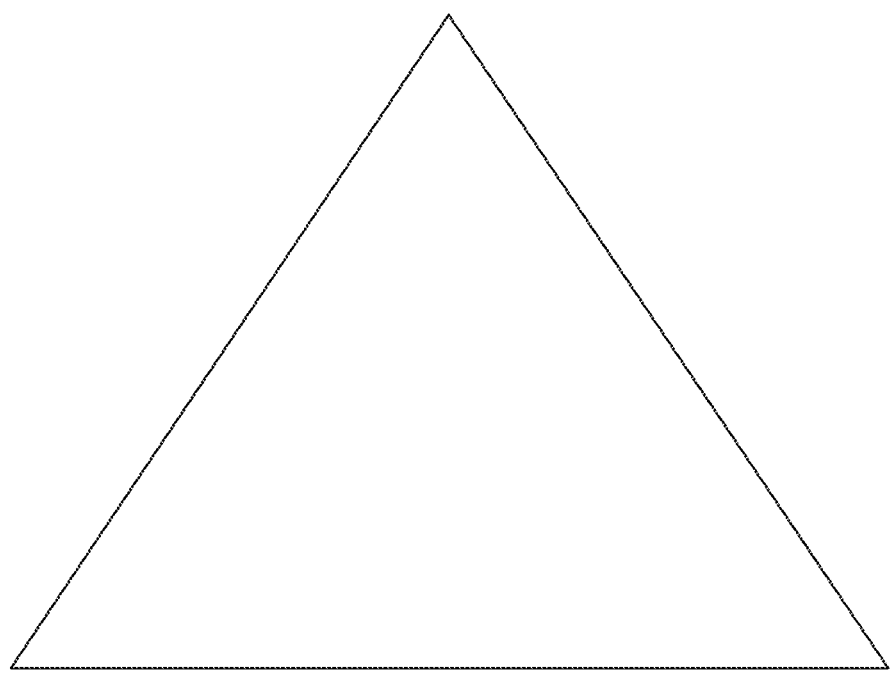
FIG. 9B shows an illustration of a typical acquisition plane of a 2D ultrasound probe (a triangular scanning sector).
Figure 9C:
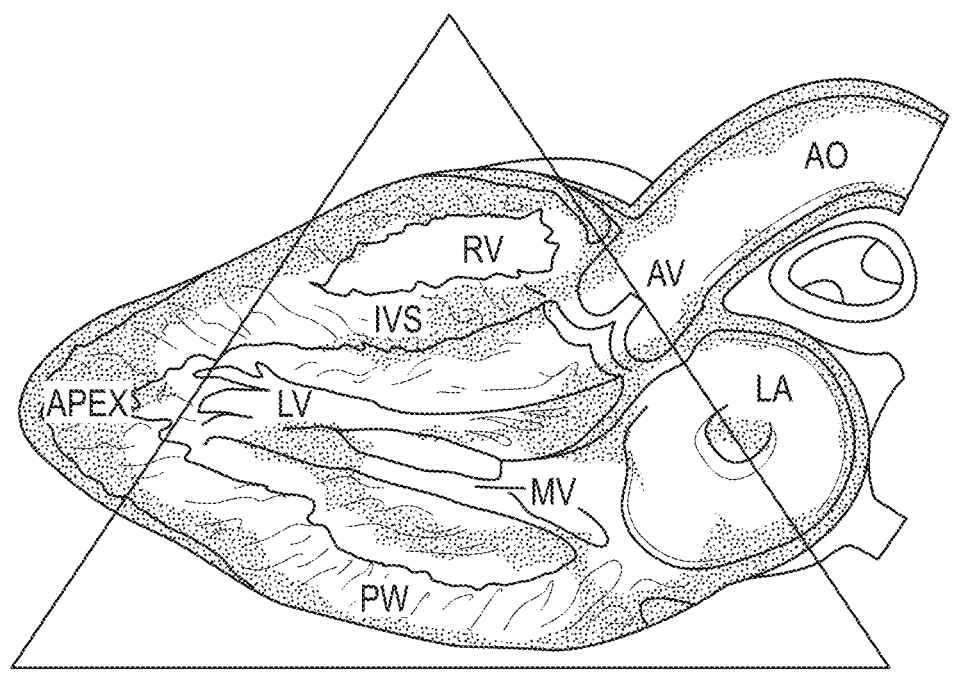
FIG. 9C shows an illustration of a sub-view of a heart, which is a standard parasternal long axis canonical view. This example sub-view shows portions of right and left ventricle, and aortic and mitral valves inside the triangular scanning sector. Standard parasternal long axis canonical view showing portions of right and left ventricle, and aortic and mitral valves inside the triangular scanning sector.
Figure 9D:
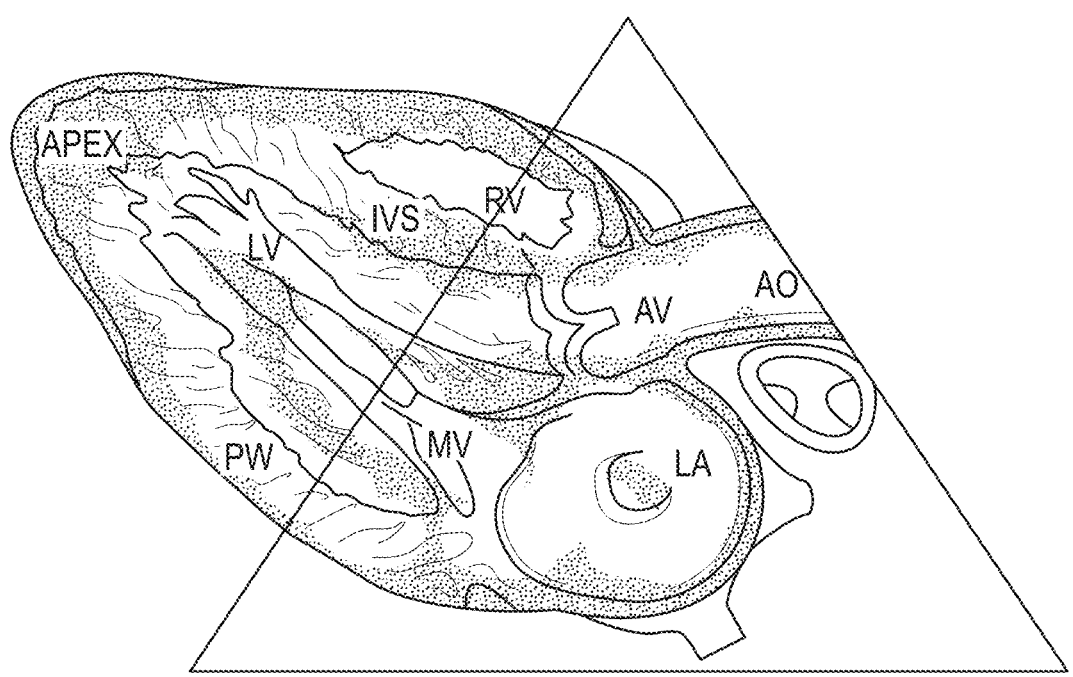
FIG. 9D shows an illustration of a sub-view of a heart which is a non-standard, non-canonical view. This example sub-view shows a variation of a standard parasternal long axis view which is shifted off-axis. Such a non-standard view can be utilized to improve visualization of the aorta. Since the scan interrogation plane is shifted so it is no longer a canonical PLAX view showing all the components of the canonical view, but instead is optimized for the aorta. Variation of subview of parasternal long axis view. In order to visualize the aorta the scan interrogation plane is shifted so it is no longer a canonical PLAX view showing all the components of the canonical view, instead is optimized for the aorta.
Figure 9E:
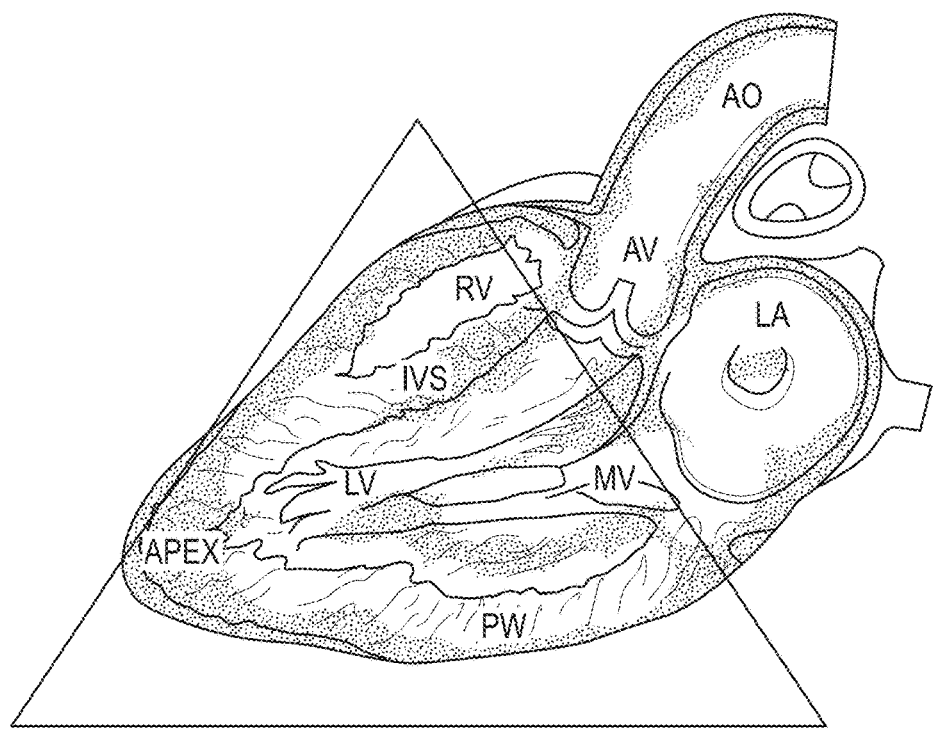
FIG. 9E shows an illustration of an alternate sub-view of a heart which is a non-standard, non-canonical view. This alternate example shows an alternate variation a parasternal long axis view. Such a non-standard view can be utilized to improve visualization of the left ventricle and the apical portion of the myocardium, by shifting the scan interrogation plane to acquire the illustrated sub-view, which is no longer a canonical PLAX view showing all the components of the canonical view, but is instead optimized for the apical portion of the heart. Variation of subview of parasternal long axis view. In order to visualize more of the left ventricle and the apical portion of the myocardium, the scan interrogation plane is shifted so it is no longer a canonical PLAX view showing all the components of the canonical view, instead is optimized for the apical portion of the heart.

FIG. 8 shows a non-limiting, illustrative example of the navigational guidance movement instructions for multiple sub-views and the corresponding data that may be generated for each sub-view. The graphical display shows the following anatomical target sub-views: PLAX (parasternal long axis) 802, PSAX AV (parasternal short axis aortic valve level) 801, PSAX MV (parasternal short axis mitral valve level) 803, PSAX PM (parasternal short axis papillary muscle level) 804, AP5 (apical five chamber) 805, SC4 (subcostal four chamber) 809, SC IVC (subcostal inferior vena cava) 810, AP4 (apical four chamber) 808, AP3 (apical three chamber) 807, and AP2 (apical two chamber) 806. As shown in the multiple anatomical sub-views in FIG. 8, any given sub-view can include one or more of the following data parameters: echo distance (ED) corresponding to the distance from the current probe position to the optimal position, image quality (IQ) corresponding to the clinical image quality of the image derived from echo distance, prescriptive guidance types (PG types) corresponding to the different types of probe movements identified and qualified, and confidence that a particular probe movement type is correct (confidence).

Nonlimiting examples of suitable methods for determining confidence comprise identification of one or more specific image frames which have a lower error rate for generating one probe movement type than another. The probe movement associated with the lower error rate for the specific image can then be given a higher confidence level compared to one or more probe movements associated with a higher error rate.

Confidence can be based on an echo distance basis of one or more particular probe movements. The echo distance basis can comprise identification of a confidence expectation based on a particular echo distance parameter, such as the magnitude of a movement needed to reach a particular pose with a sub-view quality meeting a quality threshold, a movement vector that is shorter or easier for a user to make than another echo distance/probe movement combination, or a metric proven during algorithm training to more often result in acceptable image quality.

An echo distance parameter can have a threshold point that determines whether an image has a diagnostic quality or a non-diagnostic quality. The threshold point can be set based on a selected, particular, anatomical target, pathology, clinical question or sub-view. The confidence value for a particular probe movement with a shorter echo distance or expected to be over a given diagnostic threshold can be higher than for one or more probe movements with longer echo distances or expected to result in an images below the threshold quality. The threshold values can be adjusted for different anatomical targets, ultrasound scanning modes, sub-views, clinical questions, image quality goals, or other parameters, and probe movements that exceed these thresholds more than others can be given a higher confidence level.

Confidence can be determined by mapping, or transformation of the echo distance to an image quality score. This transformation can be implemented so that the IQ scores are optimized or customized for a particular sub-view, pathology, patient condition, clinical question, or therapeutic plan. The transformation can be adapted to accomplish one or more of these optimization goals. IQ scores can be adapted through transformation parameters to give one or more probe movements a higher confidence value than alternative probe movements.

For example, a user could be scanning a sub-view that includes a target anatomical feature such as an aortic valve, or following a protocol that includes assessing the target anatomical feature. An acquired image can produce an echo distance that comprises one or more IQ scores for the target anatomical feature (e.g. the aortic valve), and can further comprise one or more additional IQ scores for alternate target anatomical features (e.g. for the mitral valve if the primary target anatomical feature was the aortic valve). Anatomical features can be classified as primary targets and secondary targets or may be ranked according to priority by assigning each target or groups of targets one of a plurality of unique target priority identifiers. Ranked targets can be assigned different threshold values based upon their assigned rank. For example, when the primary target is the aortic valve, the echo distance to IQ score mapping could have a different threshold to trigger a probe movement for the aortic valve instead of a secondary or lower ranked target such as the mitral valve, and the movement towards the primary target could be given a higher confidence value.

Some approaches use thresholding combined with a form of time averaging and smoothing to give the user feedback that they can absorb without distraction of confusing information. However, disclosed herein are platforms, systems, and methods that address the need for a smooth user experience while providing instantaneous and multiparameter instruction by using signal processing techniques such an exponential moving average and/or a Kalman filter. This can maintain the instantaneous feedback to the user with a very gradual blending of the guidance features without requiring cutoff thresholds to be used.

This innovative approach can utilize novel uses of audio to provide guidance. The graphic display method described herein addresses the problem of getting instantaneous guidance feedback for multiple movements in a way that does not confuse the user with too much stimuli. As disclosed herein, in certain embodiments, audio methods augment or substitute for the visual method. The use of audio guidance may be advantageous because the brain may process diverse audio stimuli that are provided without temporal integration better than it can process such inputs visually.

Audio feedback can be provided to the user in various forms. Examples include simple verbal messages, such as producing an instruction to "Rotate Clockwise" through a speaker. Other examples include providing an audible beep to a user to indicate that a successful image has been captured. Non-verbal audible feedback may be used, for example, a speaker for producing various tones or sounds associated with a probe guidance instruction or image improvement step. The feedback signal could have an audible tone that increases or decreases frequency as the probe is moved from one position to another, varying with whether the direction is correct or incorrect for getting a good image. Such approaches may also rely on weighting of potential movement instructions, some form of temporal averaging or smoothing, and of selection of one or very few of a number of potential legitimate probe movements. These techniques may be used to avoid distracting and confusing the user with an overwhelming amount of verbal or tonal signals.

In some aspects, the platforms, systems, and methods disclosed herein provide for the user of an audio headset, which allows much more sophisticated audio signals to be used and implemented. In some cases, the use of an audio headset enables the left and right channels to be used to provide movement instructions relative to the left and right of the patient. For example, "Slide medial" instructions for scanning the heart, which anatomically means slide leftwards towards the middle of the probe from the left side of the body where the heart is being scanned, may be played as audio in the left channel only so only the left ear hears the instruction.

In some cases, verbal instructions and/or non-verbal instructions or sounds are used. If the instructions are continuous and of multiple types, verbal sound will be difficult for the user to comprehend. Alternatives to verbal sounds could be skeuomorphic, which uses sounds that are associated with real-world objects. For example, the playing of a slide whistle sound in the right ear could corresponding to instructions to slide right. The playing of a slide whistle sound in both ears increasing in frequency could correspond to instructions to slide up. In this approach, multiple instructions with different sound types could coexist and be provided simultaneously. Exponential moving average and/or Kalman filters, as mentioned above in relation to the visual feedback, could be used to smooth the output. "Sonic metaphors" where artificial tones or sounds that are not directly associated with existing real world sounds, but which have an intuitive ability to convey a direction, could be used instead of skeuomorphic sounds.

In some cases, the audio headset uses 3D sound techniques. 3D audio or immersive sound is used in movies, video games, navigation for the blind, and other applications. The 3D audio mimics the way a person hears by providing three dimensional localization of sound. 3D audio played through headsets can present the hearer with a sense that a sound is directional as well as conveying a sense of distance. As disclosed herein, 3D audio can be used to convey directional movement. 3D audio instructions can, for example, play a sliding sound the user perceives as up or down, which exceeds what simple left-right speakers can do. For example, 3D audio instructions can make a sound appear to be moving in a circular manner, such as a clockwise direction, starting on the right, then above, then left, then below.

The audio techniques for providing instruction or navigational guidance disclosed herein can be combined with haptic feedback. In some cases, the haptic feedback is delivered through the headset. Current haptic feedback methods focus on providing the feedback through the handheld probe, with the idea that various vibrations could tell the user how to move the probe. However, the platforms, systems, and methods disclosed herein can utilize haptic feedback alone or in combination with the visual feedback and/or audio feedback.

Accordingly, disclosed herein are platforms, systems, and methods that provide fast and reliable ultrasound guidance instructions without relying on thresholding, single instruction feedback, and timing filters.

Volume-Based Image Classification

When an expert scans a subject using an ultrasound system, they search for the defined views for a particular clinical application, and complete an exam by saving examples of those views. As they see individual pathologies and unique presentations, they often scan the same target from a variety of angles and orientations to fully capture images that represent the patient's condition.

Recently, image processing and machine learning techniques have been developed that operate during ultrasound acquisition to enhance, simplify, or automate the process. There are many functions of machine learning driven ultrasound acquisition guidance tools. These can include determining and optimizing the quality of an image during scanning, providing prescriptive guidance movements for the user to manipulate the probe for better results, or doing automated image captures. These also often generally based on defined views. In order to provide these functions, the tools have to have particular views in a library, memory, table, trained algorithm, etc. to assign an image quality score to an image, it has to somehow be compared to a reference or "canonical" view that has been determined to meet a clinical standard and provide the ability to make a diagnosis. Real-time scanning guidance often requires a view to be either pre-determined or automatically determined from the image during scanning, in order to give the user instructions for moving the probe. Automatically capturing images because they are considered diagnostic often assumes that some form of reference view is operative. Commonly this is done by having the user select a particular canonical view from a list and scan to get it.

Volume-based image classification allows for more efficient use of image data and obviates the need for many of the assumptions necessary for imaging using only standard canonical views by expanding the number of different acquisition vectors containing the same feature of a target volume a machine learning algorithm is trained with in a manner that allows the trained algorithm to understand the three dimensional structure of the target volume. This type of classification can apply to many clinical areas such as cardiac, vascular, pulmonary, abdominal, obstetric, gynecological, musculoskeletal, small organs, nerves, etc, but non-limiting illustrative examples described herein generally use imaging the heart.

Each standard canonical view of a heart in reality typically consists of a multitude of variations and subtleties. From a single window and a single plane/view, the probe can be moved in a number of ways, angled, tilted, rotated, and rocked, and still be in the main view, but provide very different images for each variation. The variations can encompass or emphasize different anatomical structures. The variations can produce different presentations of the standard anatomical targets defined by the canonical view, or they may produce presentations of different structures. Further, different instances of the same view with the same anatomical structures visible, despite being acquire off-axis from a typical canonical view, can produce important insights into pathologies or functions. This can increase the number of usable, desirable, and mandatory two dimensional mode (2D) views to over 50 in a moderately comprehensive exam. Adding blood flow scanning modes easily can double this number. Even a focused 2D exam, if there is a suspicion of pathology can end up requiring at least 20 to 30 individual video clips of views and sub-views. Including these variations can be critical to making a good and complete diagnosis in a number of instances.

Clinically, situations where the features of a canonical view are not all present in an image from a window/view/plane, but where the collection image still contains important clinical information often occur. Including situations where the view may be slightly non-canonical, off-axis, or focused on a subset of anatomy.

One challenge addressed by the machine learning algorithms described herein is that a standard view in many instances will miss important structures and anatomical details. In the hands of experts, a single view is often recognized as having a large number of variations. Many common clinical situations pose a serious problem for basic machine learning algorithms that do not know how to deal with non-standard views, off-axis views, sub-views, or standard views that are distorted by pathology or individual patient anomalies. Situations where a user may be scanning in search of a particular image, or scanning without a defined protocol, and they incidentally pass through a good view but do not note it or optimize it or save it because they are looking for something else.

Another aspect of the problem is that when scanning in search of a particular view, whether in a guided protocol or an unguided protocol, often the user will cross through diagnostic instances of other views. Because they are looking for another view, they may not realize that this has happened. As a result, they do not save the image to the patient study, or if they are using a device with automated saving, it does not get saved because the system has been set up to look for one view at a time. Often as they cross through such an incidental or adjacent view, they don't stay on it long enough to capture a long enough video clip for diagnostic purposes.

Systems described herein have machine learning features to alert them to this, allowing for a short pause in looking for the originally desired view to be made and with more dwell time on the incidental view, they would add to the patient study with minimal effort. Furthermore, many non-cardiac clinical applications of diagnostic ultrasound do not require that dynamic video clips be saved for interpretation and archiving; instead single frame images are most commonly used. In these cases, as the user moves the probe, single frames or sets of single frames can be automatically qualified and saved without interruption to the user.

This happens often in cardiac scanning partly because so many views are obtained from the same acoustic window. From a single window, rotating or tilting the probe can sweep the image through multiple sub-views. The parasternal short axis is a good example of this where tilting the beam from the aortic valve level down towards the apex of the heart gets you the PSAX mitral valve and papillary muscle levels. For the apical view, rotating can have a similar result, crossing through multiple sub-views.

The number of possible sub-views, such as off-axis views, pathology and sub-anatomy views are so numerous, unpredictable, varied, dynamic, that it is impractical to put all of them into specific protocols since even a fairly basic exam could require 50 or more different sub-views. This would become unworkable as protocols with individual lists of views or conditions to look for. Methods and systems described herein can overcome this problem by automatically acquiring and aggregating data from a plurality of sub-views in real time as they are acquired.

EchoGPS, can be implemented as a feedforward convolutional neural network that can output EchoDistances (a distance from an optimum point), while an EchoScore Algorithm, can be implemented as a module that calculates a real-time image quality feedback displayed via a Quality Meter in a scale of 0-to-100 where 70+ would indicate diagnostic quality. A Prescriptive Guidance Algorithm can be implemented as a module that determines real-time instructions to users on how to maneuver the probe to improve the chances of obtaining a diagnostic quality view.

Using volume-based guidance provides several advantages. Since the algorithm understands the 3D structure of the a target volume, problems encountered by less sophisticated guidance algorithms are avoided. For example, guidance can be provided even when the probe position is grossly incorrect, whereas less sophisticated algorithms often do not work reliably in these conditions due to being designed to operate in a regime where only one "axis" of movement is incorrect (e.g., rotate clockwise, slide laterally, etc.) with a certain amount of incorrectness. Further, improved precision in guidance instructions can be obtained.

For each view in each patient, there is at least one pose that produces the best image for that view for the given patient. Even if the probe is at one of those "ideal" poses, however, there is no guarantee that the obtained images will be of diagnostic quality due to several factors that are independent of, or external to, the proper aiming of the probe such as patient's body habitus, lung interference, and body positioning. Separating these two aspects that contribute to the image quality (probe aiming aspect vs. factors independent of, or external to, aiming) can be highly beneficial, because it can enable e.g. patient-specific auto-capture threshold as well as advanced guidance (breathing and body positioning).

Example Implementation

Instead of training a model to capture probe pose directly, a model can be trained to precisely predict the 3D pixel coordinates of certain anatomical structures in a given frame as well as the uncertainties of the predicted coordinates. These predictions are then post-processed in a downstream algorithm to predict the probe pose relative to a target volume (such as a heart). This is possible because each 3D coordinate prediction constraints the range of possible probe pose, and thus having multiple such coordinates can narrowly dictate the most likely probe pose with (overconfident) constraints. The resulting model ("6D EchoGPS") can output intermediate quantities (i.e., 3D coordinates of the structures and their uncertainties) that are (compared to e.g. direct probe pose predictions) much more generic, more reliable to support the computation of the guidance (in a downstream processing step), inherently closer to anatomy/physiology, and expressed relative to the target volume (e.g. a heart) by definition. It then becomes possible to remove unwanted assumptions made by earlier guidance systems to alleviate the limitations discussed herein.

This approach allows precise/reliable prediction of the probe pose (in addition to the estimation of the magnitude of deviation and categorical computation of Prescriptive Guidance), and the new system is capable of graphically visualizing the current probe pose relative to the ideal in e.g. a 3D user interface, hence naturally capable of providing corrective feedback (both in terms of the direction and the magnitude) in response to any combination of deviations from the ideal. In addition, this approach can support this for a much wider range of the probe pose, hence increasing the range where a specific guidance is provided. This approach further allows measurement of image quality for diagnosis in a non-isotropic way: 6D EchoGPS trained with this approach can explicitly outputs the coordinates of the key anatomical structures.

This information can be post-processed such that deviation in a certain direction would have higher impact on the deviation in other directions. This also can allow having several different types of ideal images in each view (e.g. multiple sub-views).

6D EchoGPS can output not only the coordinate predictions but also their uncertainties. The former can directly estimate the image quality due to the probe aiming and the latter can directly estimate the image quality due to other aspects independent of or external to the probe aiming. Notice that, aside from the probe movement, the image is affected by the patient's heart beating, breathing, body pose, and body habitus, among others.

By looking at the pattern of coordinate predictions (e.g., pairwise distances between coordinates, or deflection of coordinates) and/or the uncertainty predictions (e.g., average uncertainties of (a subset of) structures) over a short time scale (on the order of e.g. <2 s), the heart cycle, loosely defined as "the timepoint" or "the temporal phase" in heart beating (which is periodic) can be estimated. Such an estimate (1) allows separating out the effect of heart beating on image quality, and (2) stabilizes guidance output, so that it wouldn't be adversely affected by the heart beating (e.g. guidance being changed due to heart beating without any probe/patient movement), improving usability of the guidance system. This type of heart cycle estimation can also be supplemented by training the machine learning algorithm (e.g. a neural network) to directly predict the heart cycle, where the training signal could be obtained from a combination of e.g. ECG signal, manual labeling, etc.

By looking at the pattern of coordinate predictions (e.g., pairwise distances between coordinates, or deflection of coordinates) and/or the uncertainty predictions (e.g., average uncertainties of (a subset of) structures) over a longer time scale (on the order of e.g. >2 s), the breathing cycle can also be estimated. Similar to the heart cycle, such an estimate (1) allows separating out the effect of breathing on image quality, and (2) stabilizes the guidance output, so that it wouldn't be adversely affected by patient breathing or at least the system could predict an optimal state in breathing (e.g., full inhale, full exhale, or any state between the two) for acquisition, and provide a corresponding instruction to the user, hence improving the usability. The predicted optimal state in breathing can be communicated to the user such that the user tells the patient to pause breathing at that optimal state (if the patient is awake and can control breathing), or so that the user would stop moving the probe at an otherwise optimal pose and be ready for acquisition so that the system would acquire optimal image when the patient arrived at the optimal breathing state.

After separating out one or more above aspects (such as the heart and/or breathing cycle), the system may still detect that the maximum achievable image quality is insufficient. At this point, the remaining major aspects are body pose and body habitus (patient weight, patient's particular arrangement of the heart and its structures, previous chest surgery, or any other patient-specific aspects). The system can help the user to find out the optimal body pose. By looking at the pattern of coordinate predictions (e.g., pairwise distances between coordinates, or deflection of coordinates) and the uncertainty predictions (e.g., average uncertainties of (a subset of) structures) when the user changes the patient's body pose in a controlled way (e.g., roll the patient starting from the full left-lateral decubitus position to the supine position), the effect of the body pose on the image quality can be estimated. This estimate allows the user to control the patient's body pose that would produce the most optimal image.

In all of the above scenarios, while it is ideal for the user to maintain the probe pose the same relative to the heart, it is not a requirement because the computation can be done in a way that does not require tracking of absolute values. For example, the pairwise distances between the coordinates are translation/orientation invariant, and hence can support a stable estimation that is robust against possible probe movement.

In addition to providing coordinate/uncertainty estimations for the structures and the subsequent prediction of the probe pose, this approach can keep some of the existing features such as grading the quality of the imagery and determine whether it meets diagnostic purposes, hence worthy of capturing.

The EchoGPS algorithm can be a software module that implements a 6D EchoGPS model, which estimates the coordinates of the structures along with their uncertainties from the ultrasound imagery. It can also performs necessary preprocessing (e.g., image resizing and normalization) and postprocessing (such as aggregation/"averaging" of multiple per-frame predictions across time for more accurate and smooth estimates).

The EchoAim algorithm can then estimate the precise probe pose relative to the ideal based on the 6D EchoGPS output. This algorithm can be utilized to provide the user with specific instructions (both in terms of direction and magnitude) on how to manipulate/aim the probe to optimize the view.

The EchoScore Algorithm can convert 6D EchoGPS output to a normalized score that is proportional to the proximity between the estimate and the ideal probe positioning ("EchoScore"), which can be used to provide real time feedback on the quality or correctness of probe positioning and can be utilized for features such as retrospectively saving the best imagery over time and/or automatically capturing imagery once the score becomes sufficiently high for diagnostic purposes.

These algorithms can operate together to provide real-time guidance to the ultrasound user, so that even a non-specialist user may follow the guidance to acquire images suitable for diagnostic quality with minimal training. See FIG. 1 for an overview of this workflow.

EchoGPS Algorithm with 6D EchoGPS

EchoGPS Algorithm contains and runs 6D EchoGPS with necessary pre- and post-processing. 6D EchoGPS estimates the 3D coordinates of the eight chosen anatomical structures' centroids on input imagery as well as their uncertainties. This estimation is agnostic/independent to the sub-view: it outputs the same type of estimation regardless of the sub-view, and the sub-view specific guidance is produced by the downstream algorithms.

Also, the 6D EchoGPS can be implemented as a stateless neural network: where it operates for each frame without any reference/memory to previous frames, only making "per-frame" predictions.

Coordinate System for 6D EchoGPS

Figure 2:
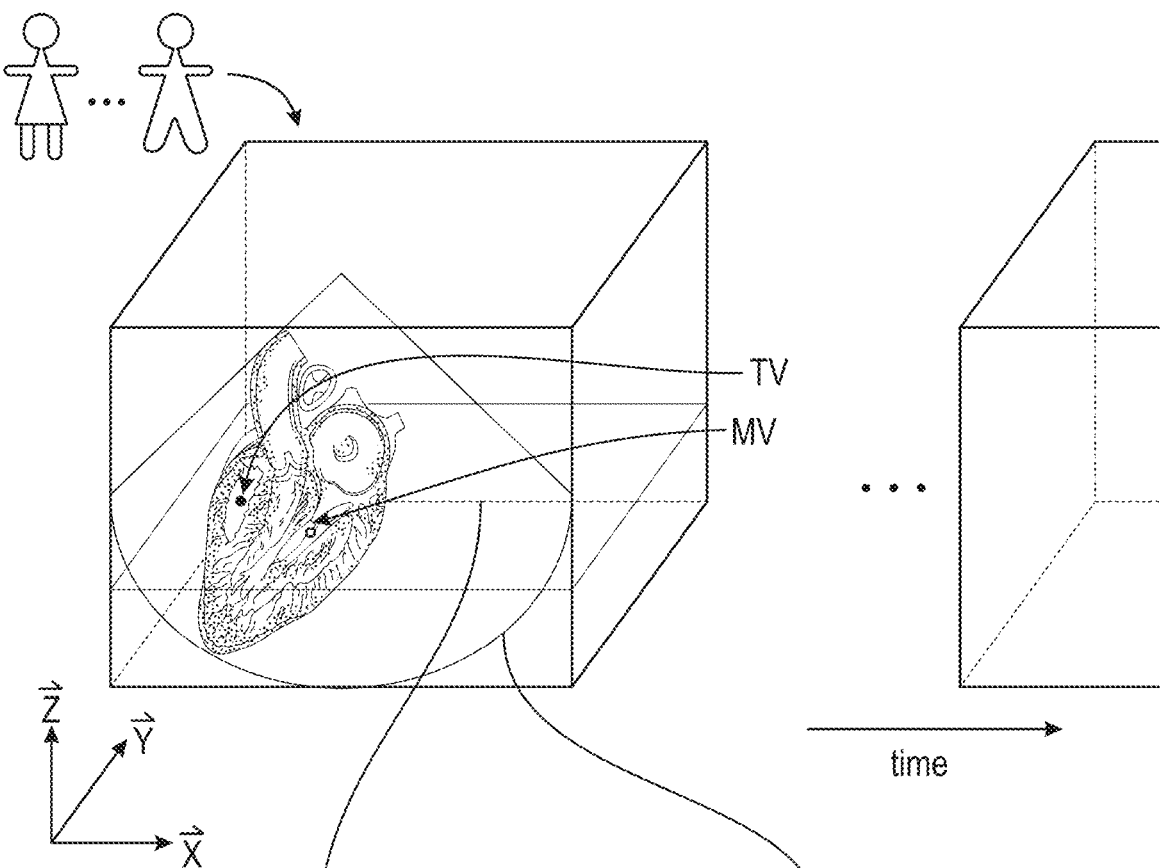
FIG. 2 Illustrates an example procedure to create a dataset for a machine learning algorithm which understands a three dimensional structure of an imaging target. (a) From each subject, the 4D (=3D+time) volumetric ultrasound imaging data are acquired. In the volume, the 3D (x, y, z) position of each of the chosen structures is annotated assuming that the position does not move significantly across time. This example shows two (MV in red dot and TV in orange dot) of them. From this volume, multiple projections are made (gray planes). This procedure is repeated for multiple subjects. (b) Each projection yields a 2D ultrasound image and the 3D positions of the chosen structures. The coordinate system used here (green) is always "local" to the projection that created the 2D image: the origin is at the top center; the $\vec{p}$ direction is towards the depth; the $\vec{\iota}$ direction is towards the opposite side of the indicator (blue dot); the n $\%\vec{\cdot}$. direction is the cross product of $\vec{p}$ and $\vec{\iota}$ (here, the direction into the paper). The length of 1 is defined as the height of the image (which is equal to the full depth of the ultrasound cone). Because of the 3D-ness of the coordinates, even if a structure is not explicitly visible on a given 2D image, the 3D coordinate for the structure always exists, is valid, and can be obtained, for example using a label where the structure has been labeled for that subject's volume. In this example projection, the MV (red dot) is visible in the plane whereas the TV (orange cross) is not. Even though the TV is not visible, this projection still has the valid position for the TV (with a nonzero n component of 0.2). (c) From a given volume, many projections can be made, each of which has the 2D projected image and the 3D coordinates for the structures. This combination (the 2D image and 3D coordinates) can form one labeled example. Across multiple subjects and multiple projections from each of the subjects, a large number of such labeled examples can be obtained. The entire collection of these examples can form a dataset which is used to train a machine learning algorithm as described herein.
Figure 2:
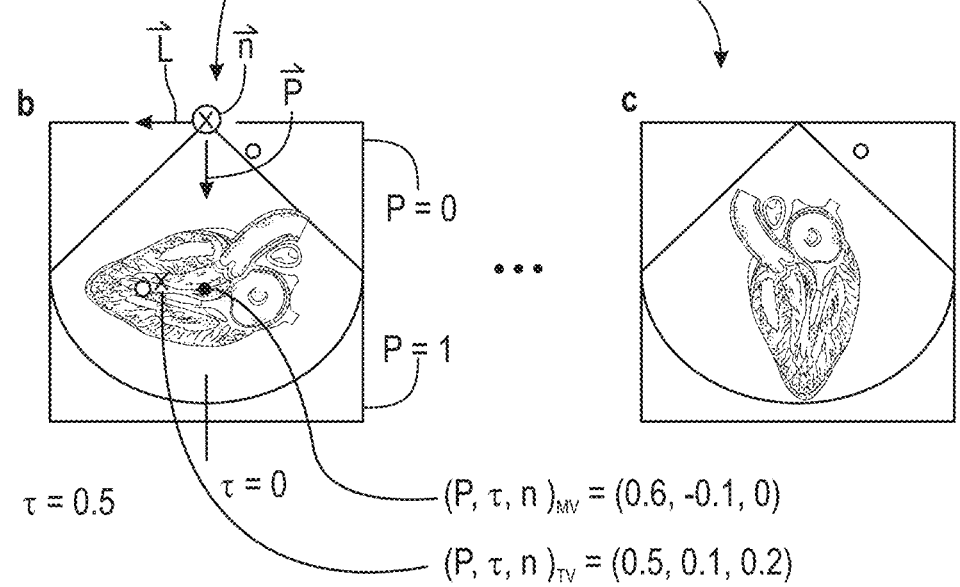

The dataset for the 6D EchoGPS can be obtained by labeling training data with the 3D centroid locations of the target structures within a target volume (FIG. 2a).

From each labeled 4D volume, a number of projections (a certain slicing of the 3D volume at a certain time point can be made to obtain labeled examples (FIGS. 2b and 2c): each example is the association between a 2D image and the 3D pixel coordinate of the centroid for each of the eight structures in that image. This process can be repeated across subjects to obtain a collection of such labeled examples. See FIG. 2 for overview. This collection can then be split into e.g. training, evaluation, and final holdout sets at the subject-level for cross-validation.

An ultrasound device with a 3D probe provides an efficient way to acquire the volumetric data because such devices can acquire the 4D (=3D+time) volumetric data natively.

Figure 3:
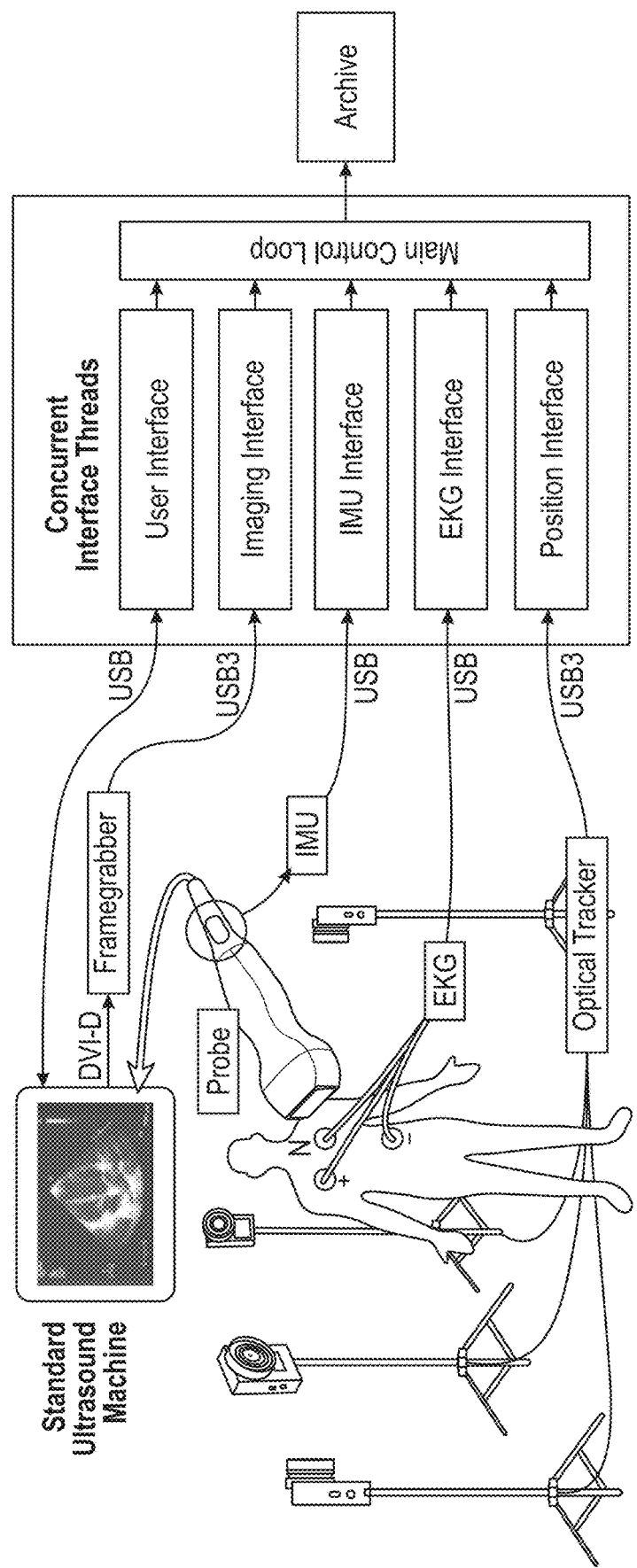
FIG. 3 illustrates an example recording system for collection of training data. The example setup records ultrasound imagery from a standard ultrasound device, augmented with positioning data from an optical tracker and/or an IMU or other probe position sensor in real-time.
Figure 4E:
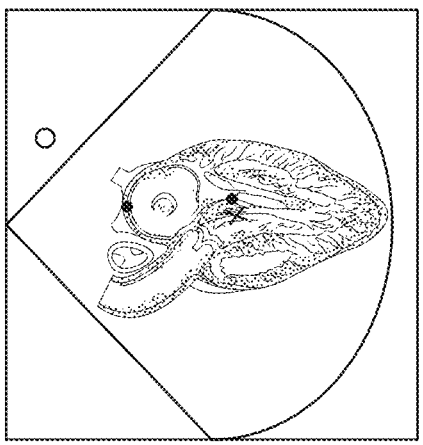
FIG. 4E illustrates determination of the current probe pose relative to the idea for the target view. In this example, the AP4 view of a heart is used as the target. In this image, TV is substantially out of the imaging plane (with positive n component).
Figure 4F:
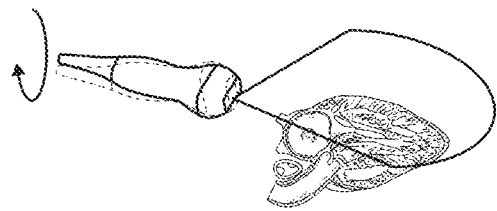
FIG. 4F illustrates determination of the current probe pose relative to the idea for the target view. In this example, the AP4 view of a heart is used as the target. Based on the arrangement of MV, TV, and apex, the probe pose that caused this suboptimal view is computed relative to the ideal probe pose. The user needs to rotate the probe clockwise to improve the view.
Figure 4C:
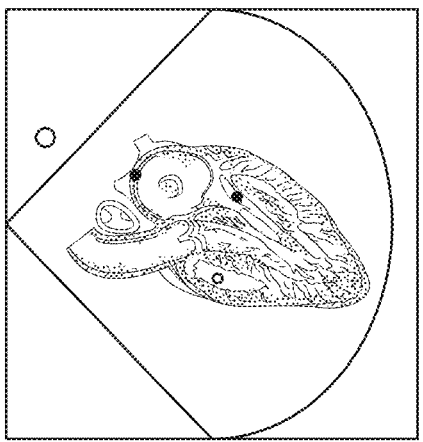
FIG. 4C illustrates determination of the current probe pose relative to the idea for the target view. In this example, the AP4 view of a heart is used as the target. In this suboptimal AP4 image, while MV, TV, and apex are within the imaging plane, the MV and TV are slanted.
Figure 4D:
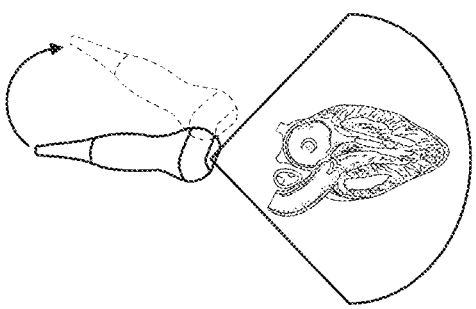
FIG. 4D illustrates determination of the current probe pose relative to the idea for the target view. In this example, the AP4 view of a heart is used as the target. Based on the arrangement of MV, TV, and apex, it is possible to deduce the probe pose that caused this suboptimal view relative to the ideal probe pose. The user needs to rock the probe towards the indicator (arrow) to improve the view.
Figure 4A:
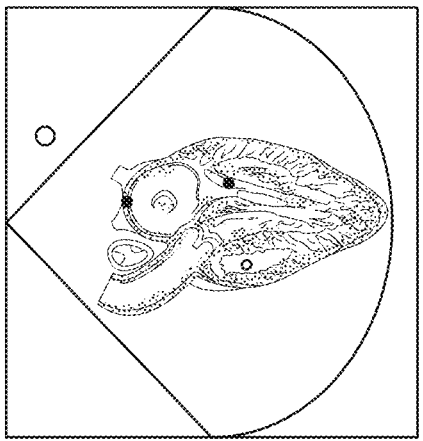
FIG. 4A illustrates determination of the current probe pose relative to the idea for the target view. In this example, the AP4 view of a heart is used as the target. In the ideal AP4 view, the four chambers, MV, TV, and apex are well visualized. MV, TV, and apex should be reasonably within the imaging plane (n~0). MV and TV should also be situated at a similar depth (p direction).
Figure 4B:
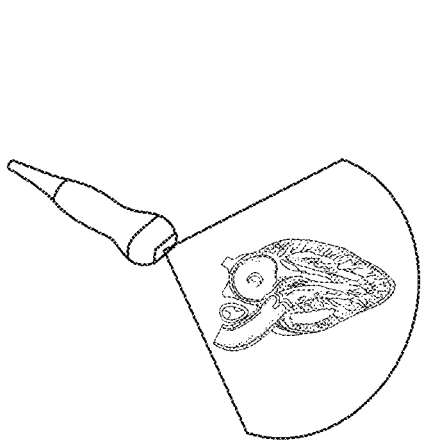

Several methods can be used for volumetric data acquisition:

Aggregation of independent volumes (AIV) method: In this method, multiple 4D volumes from different probe poses are acquired from a subject. If there is at least one volume that does not overlaps any other volumes, then the probe pose must be tracked using an external sensor (e.g., optical or magnetic pose tracking system; see FIG. 3 as an example) in order to bring the volumes into a single 3D spatial coordinate system (x, y, z); or alternatively, images can be acquired in a way that every volume partially overlaps with at least one another volume to allow registering all the volumes in a single spatial coordinate system with image processing without external tracking of the probe pose. Once the volumes are aggregated into a common spatial coordinate system, then the 3D positions of the structures can be labeled. It then becomes possible to make projections from this aggregation, where each projection would be sampled from one particular (randomly chosen) individual volume; since the volumes do not overlap closely, the aggregation can have too many "holes" between volumes, and therefore require a projection to be sampled from one constituent volume.

Fused volume (FV) method: This method involves acquiring multiple volumes with sufficient overlapping with each other so that there wouldn't be too many "holes" between them, hence allowing fusing of them into a single "fused" large volume. Ideally this fusing would be done in the 4D space, both spatially and temporally. This process can be facilitated by the external probe pose tracking sensor or the EKG (to assist temporal registration) or both, although could be done by extensive image-based registration if the quality of individual volumes is high.

The FV method involves much higher level of postprocessing and could potentially introduce artifacts that do not exist in the original ultrasound data, but it allows much dense and diverse sampling of projections.

The AIV method is simpler and will not introduce imaging artifacts, at the expense of diminished ability to sample projections, although this could be mitigated by more dense sampling of constituent volumes.

While this 3D ultrasound-based method is powerful in itself, the 2D ultrasound-based method can greatly complement the 3D method 2D Ultrasound-Based Volumetric Data Acquisition This method aims to create "volumetric" data from traditional 2D B-mode ultrasound images. A large number of 2D ultrasound frames from a given subject with an external probe pose tracking sensor such as an optical tracking system (FIG. 3) can be acquired. Data can be acquired in e.g. large random sweeping motions to maximally cover the 6D probe pose space relative to the target volume (such as a heart). The position labels for structures within the volume can be determined by locating the 2D positions of the centroids of the structures in different 2D image planes that optimally visualize them. Because the probe pose that produced each 2D image plane relative to the patient's chest is known precisely, it is possible to determine the structure 3D coordinates inside the subject's chest by combining multiple 2D positions (or "inversing" the projections). For example, when the target volume is a heart, the 3D position of the MV of a subject is determined by the 2D location labels from PLAX, AP4, AP2, AP3, and SubC4 of the same subject, combined with the probe poses that defined "projections" for these planes. The 2D label variability for each structure in each patient is determined, and any structure whose labels varied more than 3 cm across the 2D planes is rejected to assure label quality. Once this process is done for the subject, then it becomes possible to determine the 3D positions of the structures in each of the 2D planes, therefore yielding the same type of labeled examples that would be generated by the 3D ultrasound-based method.

Ultrasound image quality: The spatial and temporal resolution of the 2D ultrasound images is generally much higher than that of the 3D, which can be especially important for intricate structures such as valves. 2D and 3D ultrasound-based methods are complimentary to each other, and therefore both methods can be used to develop 6D EchoGPS: the 3D method guarantees that diverse projections are sampled in the chest space with higher coordinate labeling accuracy whereas the 2D method fills the gap that may be left in terms of the image quality and deployment target device.

Example Training of a 6D EchoGPS Model

The labeled examples prepared as described previously are used to train 6D EchoGPS model utilizing a neural network. 6D EchoGPS is trained to predict the 3D coordinates of the eight heart structures and the estimation variance of these, hence outputting a 48-dimensional vector (8×3=24 for coordinates and another 24 for their variances) for each given image. Note that there are no separate, explicit labels for the variances; they are imputed by the neural network itself during the training phase to account for the uncertainty/inconsistency between its own prediction of coordinates and the ground-truth coordinates. That is, the network itself learns to guess its own prediction uncertainty using a loss function. While it is ideal to have labels for all the structures for a given image, not having labels for some structures is permitted; in that case, the network are not penalized for the coordinate and the variance predictions for the missing structures.

EchoScore

An EchoScore Algorithm can take time-aggregated coordinate and variance estimates from EchoGPS Algorithm and compute an EchoScore, a quantity in a scale of 0 to 100 that would represent the quality of the image for the target view the user intends to acquire. EchoScore is used both to guide the user and to programmatically record echocardiographic clips via "Auto-Capture" and "Save-Best-Clip" features.

Improved 3D Clinical Information Using 2D Ultrasound Imaging Devices

The speed of ultrasound as it travels through tissue is approximately 1,540 meters per second. This creates a physical limit to the maximum number of pulses the front-end can fire per second, especially to produce diagnostic framerates and real-time tissue movement depiction. Hundreds of microseconds are required for a round trip pulse to reach the deepest depth of interest and then to propagate back to the acoustic array. With deeper scanning depth settings, as is needed for deep structures and in large subjects, this problem is increased. To provide cohesive, differentiated echoes, the next pulse cannot be fired until all return echoes from the previous pulse have returned to the transducer. For a 16 cm depth of interest, which is a typical, even relatively shallow scanning depth for cardiac, abdominal, and obstetric imaging, the round-trip propagation time is ~200 microseconds. This limits the number of pulses to ~5,000 per second. The speed of sound limits the maximum pulse rate, and the size of the volume, target volume rate and lateral resolution determines the total number of beams needed per second. These physical constraints are multiplied in 3D imaging. For example, full routinely diagnostic volume transthoracic echo imaging, where the scan angle is 90 degrees by 90 degrees, at a target volume rate of 25 volumes per second requires forming 100,000 to 200,000 beams per second, depending on the lateral resolution. To form this many beams with only 5,000 transmit pulses, the front-end needs to form 20 to 40 beams in parallel for each transmit pulse. This processing capacity exceeds the capacity of most ultrasound systems and requires specialized and expensive compute hardware. Real-time imaging of motion, flow or parameters requires even higher parallel beam counts as they need a higher number of pulse-echo events for the same volume size. To address these constraints, trade-offs and compromises are made in the real-time acquisition parameters of 3D devices. Methods and systems described herein can reduce the impact of these trade-offs by enhancing the information contained in an acquired 2D ultrasound image using 3D structural information obtained from a trained machine learning algorithm.

Figure 10:
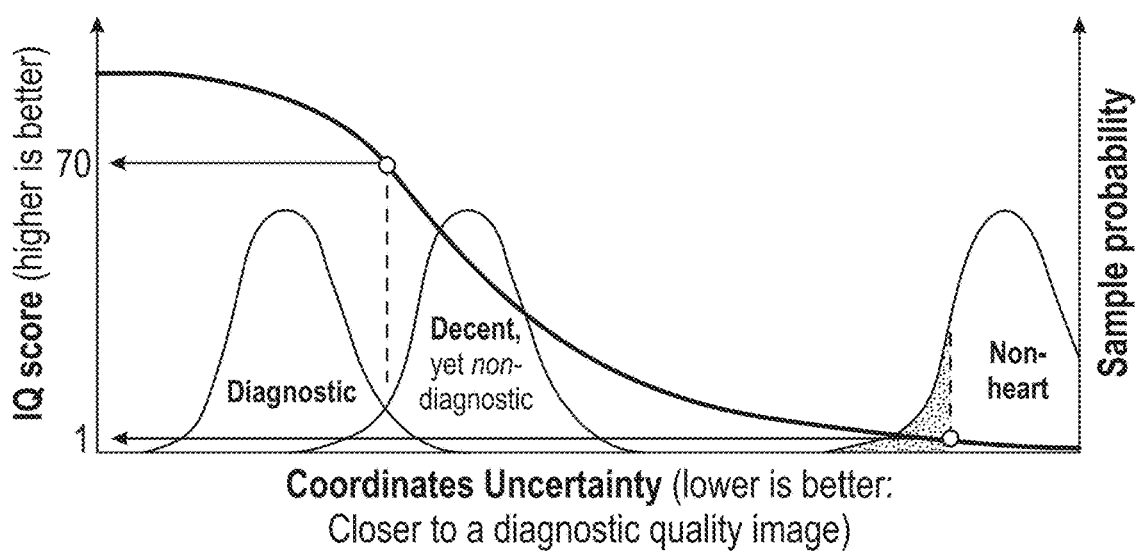
FIG. 10 illustrates the value of inclusion of non-standard sub-views in a study based on image quality and uncertainty.

Structure coordinates and uncertainty output from the machine learning algorithms described herein may be converted into the IQ score in a downstream processing step outside of the network. The IQ score is an indicator of the input image quality in a scale of 0-100. One mapping method can use the image quality assessments to assign higher image quality scores to images with lower coordinate uncertainly values. This is possible for multiple sub-views. An example showing this is depicted in FIG. 10.

Machine Learning Algorithms

Disclosed herein are platforms, systems, and methods that provide ultrasound guidance instructions using machine learning algorithm(s). In particular, in some embodiments, the machine learning algorithms include deep learning neural networks configured for evaluating ultrasound images. The algorithms can include one or more of a positioning algorithm ("EchoGPS"), a scoring algorithm ("EchoScore"), and a probe guidance algorithm ("Prescriptive Guidance"). The positioning algorithm can include one or more neural networks that estimate probe positioning relative to an ideal anatomical sub-view or perspective and/or a distance or deviation of a current probe position from an ideal probe position.

The development of each machine learning algorithm spans three phases: (1) dataset creation and curation, (2) algorithm training, and (3) adapting design elements necessary for product performance and useability. The dataset used for training the algorithm can be generated by obtaining ultrasound images that are then curated and labeled by expert radiologists, for example, according to positioning, score, and other metrics. Each algorithm then undergoes training using the training dataset, which can include one or more different target organs and/or one or more different sub-views of a given target organ. The training dataset for the positioning algorithm may be labeled according to a known probe pose deviation from the optimal probe pose. A non-limiting description of the training and application of a positioning algorithm or estimator can be found in U.S. patent application Ser. No. 15/831,375, the entirety of which is hereby incorporated by reference. Another non-limiting description of a positioning algorithm and a probe guidance algorithm can be found in U.S. patent application Ser. No. 16/264,310, the entirety of which is hereby incorporated by reference. The design elements can include a user interface comprising an omnidirectional guidance feature.

Examples of machine learning algorithms can include a support vector machine (SVM), a naïve Bayes classification, a random forest, a neural network, deep learning, or other supervised learning algorithm or unsupervised learning algorithm for classification and regression. The machine learning algorithms can be trained using one or more training datasets.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by 10% unless otherwise specified.

As used herein, a "pose" comprises both a location and an orientation such as an angle or radial displacement between the pose and a reference point.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Computing System

Figure 11:
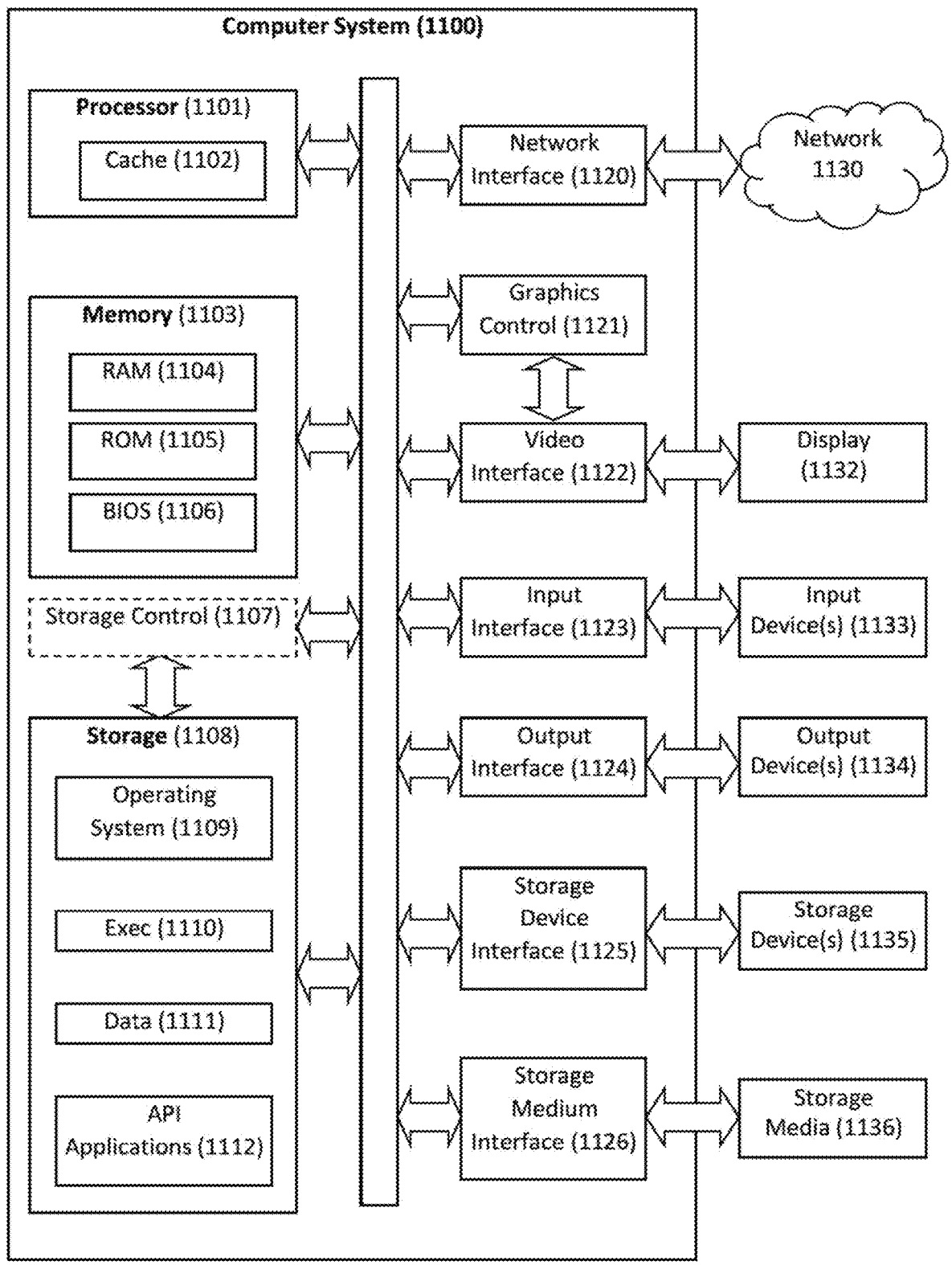
FIG. 11 shows a non-limiting example of a computing device; in this case, a device with one or more processors, memory, storage, and a network interface.

Referring to FIG. 11, a block diagram is shown depicting an exemplary machine that includes a computer system 1100 (e.g., a processing or computing system) within which a set of instructions can execute for causing a device to perform or execute any one or more of the aspects and/or methodologies for static code scheduling of the present disclosure. The components in FIG. 11 are examples only and do not limit the scope of use or functionality of any hardware, software, embedded logic component, or a combination of two or more such components implementing particular embodiments.

Computer system 1100 may include one or more processors 1101, a memory 1103, and a storage 111108 that communicate with each other, and with other components, via a bus 1140. The bus 1140 may also link a display 1132, one or more input devices 1133 (which may, for example, include a keypad, a keyboard, a mouse, a stylus, etc.), one or more output devices 1134, one or more storage devices 1135, and various tangible storage media 1136. All of these elements may interface directly or via one or more interfaces or adaptors to the bus 1140. For instance, the various tangible storage media 1136 can interface with the bus 1140 via storage medium interface 1126. Computer system 1100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 1100 includes one or more processor(s) 1101 (e.g., central processing units (CPUs) or general purpose graphics processing units (GPGPUs)) that carry out functions. Processor(s) 1101 optionally contains a cache memory unit 1102 for temporary local storage of instructions, data, or computer addresses. Processor(s) 1101 are configured to assist in execution of computer readable instructions. Computer system 1100 may provide functionality for the components depicted in FIG. 11 as a result of the processor(s) 1101 executing non-transitory, processor-executable instructions embodied in one or more tangible computer-readable storage media, such as memory 1103, storage 1108, storage devices 1135, and/or storage medium 1136. The computer-readable media may store software that implements particular embodiments, and processor(s) 1101 may execute the software. Memory 1103 may read the software from one or more other computer-readable media (such as mass storage device(s) 1135, 1136) or from one or more other sources through a suitable interface, such as network interface 1120. The software may cause processor(s) 1101 to carry out one or more processes or one or more steps of one or more processes described or illustrated herein. Carrying out such processes or steps may include defining data structures stored in memory 1103 and modifying the data structures as directed by the software.

The memory 1103 may include various components (e.g., machine readable media) including, but not limited to, a random access memory component (e.g., RAM 1104) (e.g., static RAM (SRAM), dynamic RAM (DRAM), ferroelectric random access memory (FRAM), phase-change random access memory (PRAM), etc.), a read-only memory component (e.g., ROM 1105), and any combinations thereof. ROM 1105 may act to communicate data and instructions unidirectionally to processor(s) 1101, and RAM 1104 may act to communicate data and instructions bidirectionally with processor(s) 1101. ROM 1105 and RAM 1104 may include any suitable tangible computer-readable media described below. In one example, a basic input/output system 1106 (BIOS), including basic routines that help to transfer information between elements within computer system 1100, such as during start-up, may be stored in the memory 1103.

Fixed storage 1108 is connected bidirectionally to processor(s) 1101, optionally through storage control unit 1107. Fixed storage 1108 provides additional data storage capacity and may also include any suitable tangible computer-readable media described herein. Storage 1108 may be used to store operating system 1109, executable(s) 1110, data 1111, applications 1112 (application programs), and the like. Storage 1108 can also include an optical disk drive, a solid-state memory device (e.g., flash-based systems), or a combination of any of the above. Information in storage 1108 may, in appropriate cases, be incorporated as virtual memory in memory 1103.

In one example, storage device(s) 1135 may be removably interfaced with computer system 1100 (e.g., via an external port connector (not shown)) via a storage device interface 1125. Particularly, storage device(s) 1135 and an associated machine-readable medium may provide non-volatile and/or volatile storage of machine-readable instructions, data structures, program modules, and/or other data for the computer system 1100. In one example, software may reside, completely or partially, within a machine-readable medium on storage device(s) 1135. In another example, software may reside, completely or partially, within processor(s) 1101.

Bus 1140 connects a wide variety of subsystems. Herein, reference to a bus may encompass one or more digital signal lines serving a common function, where appropriate. Bus 1140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1100 may also include an input device 1133. In one example, a user of computer system 1100 may enter commands and/or other information into computer system 1100 via input device(s) 1133. Examples of an input device(s) 1133 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 1133 may be interfaced to bus 1140 via any of a variety of input interfaces 1123 (e.g., input interface 1123) including, but not limited to, serial, parallel, game port, USB, FIREWIRE, THUNDERBOLT, or any combination of the above.

In particular embodiments, when computer system 1100 is connected to network 1130, computer system 1100 may communicate with other devices, specifically mobile devices and enterprise systems, distributed computing systems, cloud storage systems, cloud computing systems, and the like, connected to network 1130. Communications to and from computer system 1100 may be sent through network interface 1120. For example, network interface 1120 may receive incoming communications (such as requests or responses from other devices) in the form of one or more packets (such as Internet Protocol (IP) packets) from network 1130, and computer system 1100 may store the incoming communications in memory 1103 for processing. Computer system 1100 may similarly store outgoing communications (such as requests or responses to other devices) in the form of one or more packets in memory 1103 and communicated to network 1130 from network interface 1120. Processor(s) 1101 may access these communication packets stored in memory 1103 for processing.

Examples of the network interface 1120 include, but are not limited to, a network interface card, a modem, and any combination thereof. Examples of a network 1130 or network segment 1130 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 1130, may employ a wired and/or a wireless mode of communication. In general, any network topology may be used.

Information and data can be displayed through a display 1132. Examples of a display 1132 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 1132 can interface to the processor(s) 1101, memory 1103, and fixed storage 1108, as well as other devices, such as input device(s) 1133, via the bus 1140. The display 1132 is linked to the bus 1140 via a video interface 1122, and transport of data between the display 1132 and the bus 1140 can be controlled via the graphics control 1121. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 1132, computer system 1100 may include one or more other peripheral output devices 1134 including, but not limited to, an audio speaker, a printer, a storage device, and any combinations thereof. Such peripheral output devices may be connected to the bus 1140 via an output interface 1124. Examples of an output interface 1124 include, but are not limited to, a serial port, a parallel connection, a USB port, a FIREWIRE port, a THUNDERBOLT port, and any combinations thereof.

In addition or as an alternative, computer system 1100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TVR, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 12:
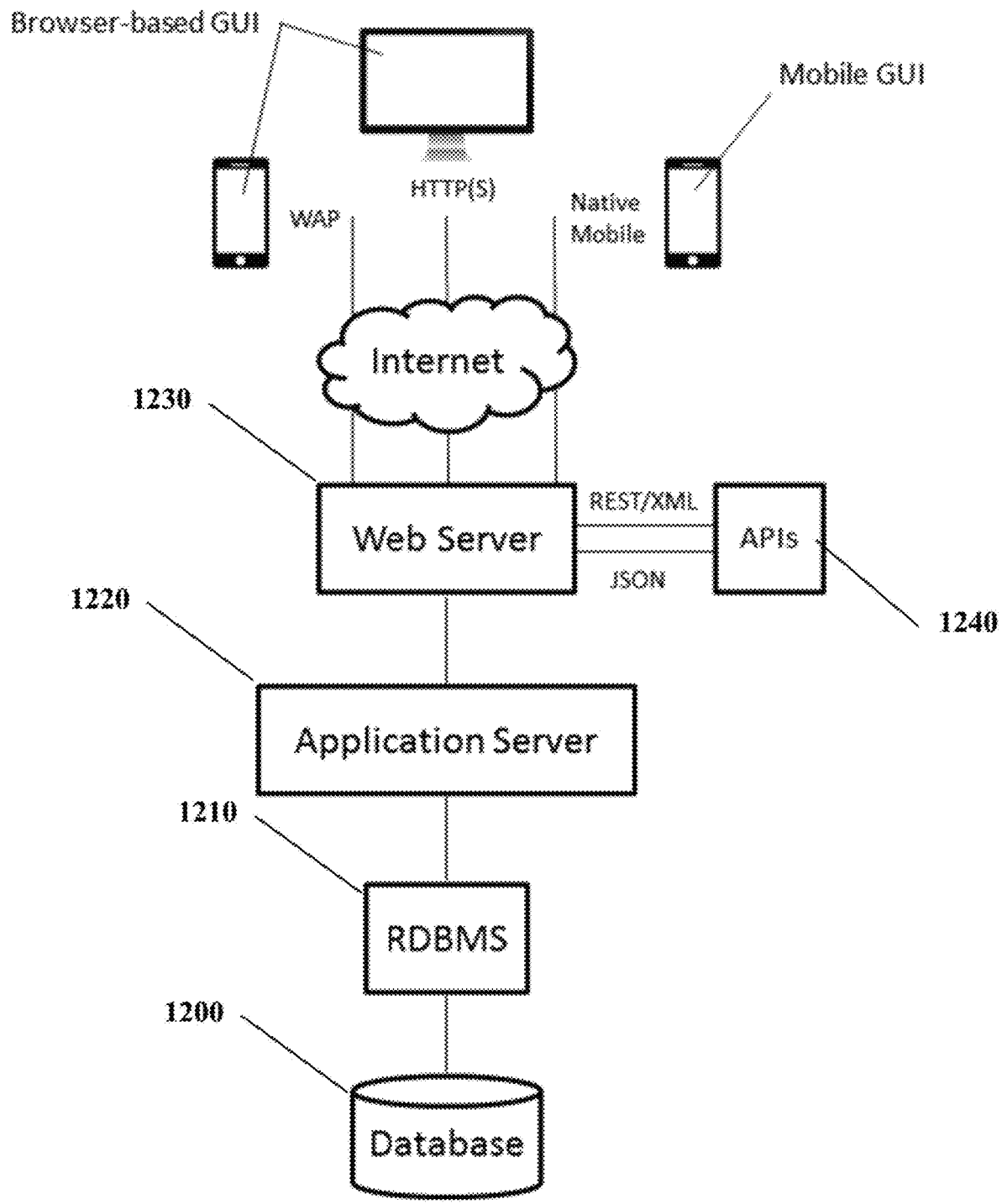
FIG. 12 shows a non-limiting example of a web/mobile application provision system; in this case, a system providing browser-based and/or native mobile user interfaces.

Referring to FIG. 12, in a particular embodiment, an application provision system comprises one or more databases 1200 accessed by a relational database management system (RDBMS) 1210. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1220 (such as Java servers, .NET servers, PHP servers, and the like) and one or more web servers 1230 (such as Apache, IIS, GWS and the like). The web server(s) optionally expose one or more web services via app application programming interfaces (APIs) 1240. Via a network, such as the Internet, the system provides browser-based and/or mobile native user interfaces.

Figure 13:
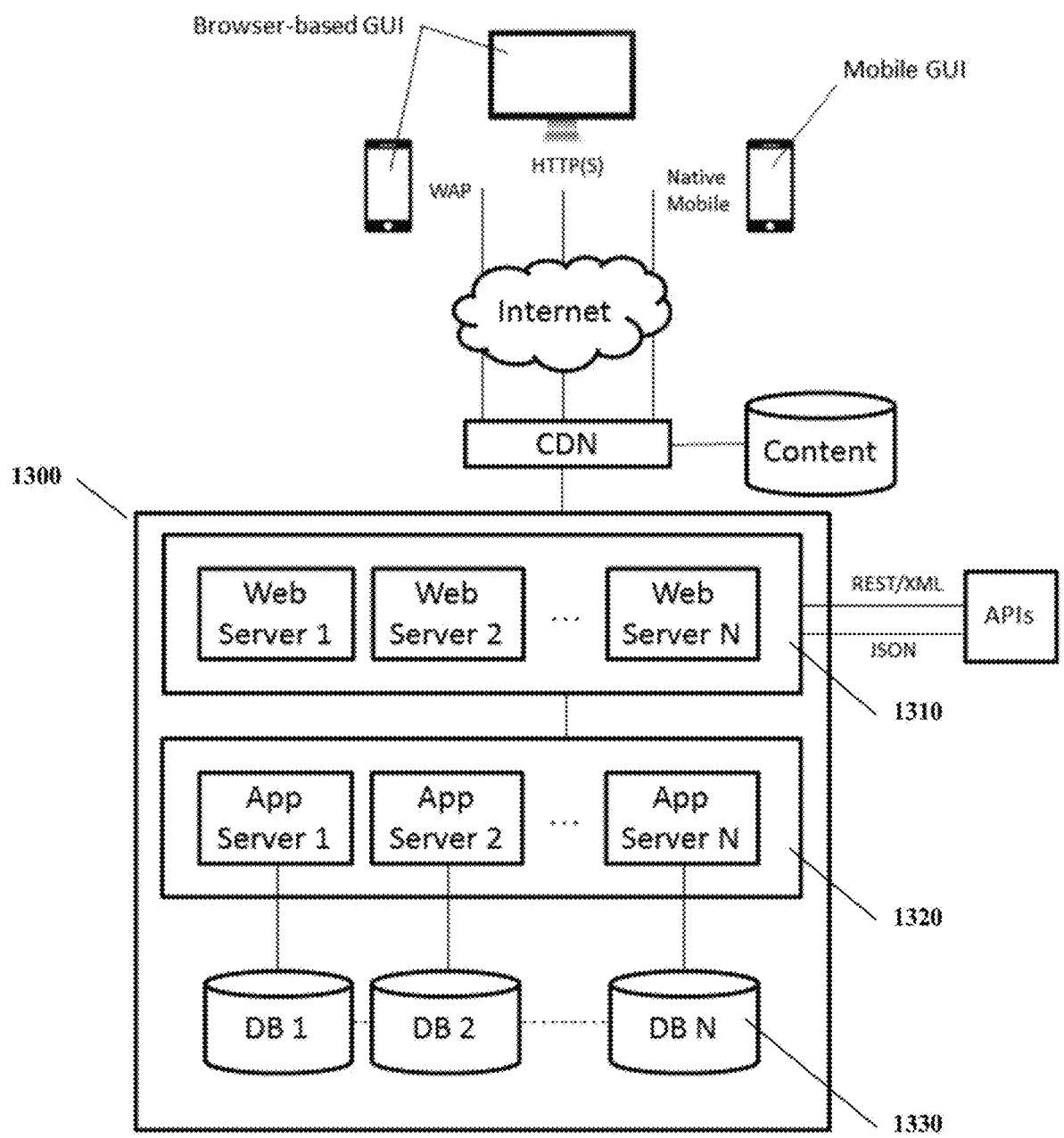
FIG. 13 shows a non-limiting example of an application provision system alternatively as a distributed, cloud-based architecture.

Referring to FIG. 13, in a particular embodiment, an application provision system alternatively has a distributed, cloud-based architecture 1300 and comprises elastically load balanced, auto-scaling web server resources 1310 and application server resources 1320 as well synchronously replicated databases 1330.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In sub-view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of DEL information and associated experimental data collected for one or more conditions. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

EXAMPLE EMBODIMENTS

1. A method for evaluating ultrasound image quality, the method comprising:
    (a) receiving an ultrasound image of a subject acquired through an ultrasound imaging system;
    (b) evaluating said ultrasound images using a trained machine learning model to determine a clinical image quality of the image with respect to a plurality of sub-views of a target structure of the subject; and (c) providing an indication of image quality for each of at least two of the plurality of sub-views to a user of the ultrasound imaging system.

2. A method for guiding an ultrasound imaging procedure, comprising:

(a) receiving one or more ultrasound images of a subject acquired through an ultrasound imaging system;

(b) evaluating said one or more ultrasound images using a trained machine learning model to determine a current position of a probe of the ultrasound imaging system and a clinical image quality of the one or more ultrasound images with respect to a plurality of sub-views of a target structure of the subject;

(c) identifying an optimal probe position for imaging for at least two of the plurality of sub-views;

(d) generating one or more probe movements for reducing a difference between the current probe position each of the identified optimal probe positions; and (e) providing guidance instructions to a user of the ultrasound imaging system to make at least one generated probe movement.

3. The method of embodiment 2, wherein generating the one or more probe movements comprises computing a confidence or probability that the generated probe movement will improve a clinical quality of acquired images.

4. The method of embodiment 3, wherein the guidance instructions prompt the user to make the determined movement determined to have a highest confidence or probability of improving clinical image quality compared to alternate generated movements.

5. The method of any one of embodiments 2-3, wherein the guidance instructions comprise a plurality of generated movements.

6. The method of embodiment 5, wherein the plurality of generated movements comprise movements corresponding to different sub-views.

7. The method of embodiment 5 or 6, wherein the plurality generated movements comprise alternate movements corresponding to a single sub-view.

8. The method of embodiment 6, wherein the guidance instructions further comprise an indication of the computed confidence or probability of the alternate movements corresponding to the single sub-view.

9. The method of any of the preceding embodiments, wherein the plurality of sub-views comprise standard canonical views and non-standard views.

10. The method of embodiment 9, wherein the standard canonical views and the non-standard views comprise both on- and off-axis views.

11. The method of embodiment 9 or 10, wherein the non-standard views comprise clinically useful information despite the overall clinical quality of an optimal image of the non-standard view being lower than a standard view (e.g. an on-axis, canonical view) of a similar imaging target.

12. The method of any of embodiments 2-11, wherein the guidance instructions are provided in real time.

13. The method of any of embodiments 2-12, wherein the guidance instructions comprise generated movements expected to direct the user to an optimal probe position for a selected sub-view of a protocol.

14. The method of any of embodiments 2-13, wherein the guidance instructions comprise generated movements expected to direct the user to an optimal probe position for a sub-view which is most proximate to the current probe position.

15. The method of any of embodiments 2-14, wherein said guidance comprises a graphical representation of each probe movement, an audio representation of said probe movement, a haptic representation of said movement, or any combination thereof.

16. The method of any one of embodiments 2-15, wherein said probe movements comprises rotation, translation, tilting, rocking, pressing, or any combination thereof.

17. The method of any one of embodiments 15-16, wherein said visual indicators, said audio indicators, said haptic indicators, or any combination thereof are configured to convey information regarding said confidence or probability of improving clinical image quality for each of said generated probe movements.

18. The method of any one of embodiments 15-17, wherein at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof.

19. The method of any one of embodiments 18, wherein said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.

20. The method of any of embodiments 2-19, further comprising providing instructions for improving clinical image quality using patient instructions, ultrasound scan system settings, or both.

21. The method of embodiment 20, wherein said patient instructions comprise patient breathing or body position.

22. The method of embodiment 20, wherein said ultrasound scan system settings comprises scan depth, gain, or both.

23. The method of embodiment 20, wherein said instructions are not identified based on a threshold correlated with image quality.

24. The method of any of the preceding embodiments, wherein said ultrasound imaging system is a portable ultrasound imaging system.

25. The method of any of the preceding embodiments, wherein said ultrasound imaging system is configured for performing echocardiography.

26. The method of any of embodiments 2-25, further comprising receiving one or more additional ultrasound images acquired through said ultrasound imaging system after displaying said guidance.

27. The method of embodiment 2-26, further comprising analyzing said at least a subset of said one or more ultrasound images or said one or more additional ultrasound images to determine clinical image quality of a video image clip.

28. The method of any one of embodiments 2-27, wherein an imaging workflow of the method further comprises at least one of automatic image saving, best clip saving, automatic image labelling, and automatic diagnostic measurements and/or combinations thereof.
29. The method of embodiment 28, wherein the imaging target comprises a feature of a heart of a subject and the automatic diagnostic measurement is a measurement related to cardiac function.
30. The method of embodiment 29, wherein the measurement related to cardiac function comprises an image-derived EKG or an ejection fraction.
31. The method of any one of embodiments 2-30, further comprising automatically saving multiple instances of the same canonical view and/or the same sub-view based at least partially on detection of diagnostic differences between the multiple instances.
32. The method of embodiment 31, further comprising automatically saving the best image clips of the multiple instances and/or automatically labeling the image clips with the corresponding sub-view.
33. The method of embodiment 32, wherein the automatic labeling further comprises labeling the sub-view with an identifier of whether or not the sub-view corresponds to a standard view (e.g. an on-axis canonical view).
34. A method for guiding an ultrasound imaging procedure, comprising:
    (a) receiving one or more ultrasound images of a subject acquired through an ultrasound imaging system;
    (b) evaluating said one or more ultrasound images using a trained machine learning model comprising a representation of a three-dimensional structure of a target volume of the subject to determine a current position of a probe of the ultrasound imaging system and/or a clinical image quality;
    (c) identifying an optimal probe position for imaging for at least one sub-view of the target volume of the subject;
    (d) generating one or more probe movements for reducing a difference between the current probe position and the identified optimal probe position; and
    (e) providing guidance instructions to a user of the ultrasound imaging system to make at least one generated probe movement.
35. The method of embodiment 34, wherein the method further comprises presenting to a user a user interface comprising a representation of the three-dimensional structure of the target volume of the subject to be imaged; and receiving from the user a selection of a target feature within the target volume, the selection comprising three-dimensional coordinates of the target feature within the target volume.
36. The method of embodiment 35, wherein the identified optimal probe position comprises an optimal probe position for imaging the selected target feature.
37. The method of any one of embodiments 35-36, wherein the representation of the three-dimensional structure of the target volume of the subject to be imaged comprises at least part of the representation comprised by the machine learning algorithm.
38. The method of any one of embodiments 35-37, wherein the representation of the three-dimensional structure of the target volume of the subject to be imaged comprises an empirical model of an ideal target volume of the subject.
39. The method of any one of embodiments 35-36, wherein the representation of the three-dimensional structure of the target volume of the subject to be imaged is a representation of an empirical model of an ideal target volume of the subject.
40. The method of any one of embodiments 35-39, wherein the representation of the three-dimensional structure of the target volume comprised by the machine learning model comprises information about a structural relationship between common feature of a plurality of sub-views.
41. The method of any one of embodiments 35-40, wherein the machine learning model is trained using a plurality of two-dimensional ultrasound image or image clips.
42. The method of any one of embodiments 35-41, wherein the machine learning model is trained using a plurality of three-dimensional ultrasound images or image clips.
43. The method of any one of embodiments 35-42, wherein the machine learning model is configurable to render a three-dimensional surface of the target volume based on information learned from a collection of training images.
44. The method of embodiment 43, wherein the collection of training images either (i) does not comprise images collected by a 3D-ultrasound system; (ii) comprises both two dimensional images and images collected by a 3D-ultrasound system; or (iii) consists exclusively of images collected by a 3D-ultrasound system.
45. The method of any one of embodiments 35-44, wherein the method comprises rendering a three-dimensional representation of a target feature within the target volume in real time from the received one or more ultrasound images.
46. The method of any one of embodiments 35-45, wherein generating the one or more probe movements comprises computing a confidence or probability that the generated probe movement will improve a clinical quality of acquired images.
47. The method of embodiment 46, wherein the guidance instructions prompt the user to make the determined movement determined to have a highest confidence or probability of improving clinical image quality compared to alternate generated movements.
48. The method of any one of embodiments 46-47, wherein the guidance instructions comprise a plurality of generated movements.
49. The method of embodiment 48, wherein the plurality of generated movements comprise movements corresponding to different sub-views.
50. The method of embodiment 48 or 49, wherein the plurality generated movements comprise alternate movements corresponding to a single sub-view.
51. The method of embodiment 50, wherein the guidance instructions further comprise an indication of the computed confidence or probability of the alternate movements corresponding to the single sub-view.
52. The method of any of embodiments 34-50, wherein the at least one sub-view comprises a plurality of sub-views, the plurality comprising standard canonical views and/or non-standard views indicative of a target feature within the target volume of the subject.
53. The method of embodiment 52, wherein the standard canonical views and the non-standard views comprise both on- and off-axis views.
54. The method of embodiment 52 or 53, wherein the non-standard views comprise clinically useful information despite the overall clinical quality of an optimal image of the non-standard view being lower than a standard view (e.g. an on-axis, canonical view) of a similar imaging target.

55. The method of any of embodiments 34-54, wherein the guidance instructions are provided in real time.
56. The method of any of embodiments 34-55, wherein the guidance instructions comprise generated movements expected to direct the user to an optimal probe position for a selected sub-view of a protocol.
57. The method of any of embodiments 34-56, wherein the guidance instructions comprise generated movements expected to direct the user to an optimal probe position for a sub-view which is most proximate to the current probe position.
58. The method of any of embodiments 34-57, wherein said guidance comprises a graphical representation of each probe movement, an audio representation of said probe movement, a haptic representation of said movement, or any combination thereof.
59. The method of any one of embodiments 34-58, wherein said probe movements comprises rotation, translation, tilting, rocking, pressing, or any combination thereof.
60. The method of any one of embodiments 58-59, wherein said visual indicators, said audio indicators, said haptic indicators, or any combination thereof are configured to convey information regarding said confidence or probability of improving clinical image quality for each of said generated probe movements.
61. The method of any one of embodiments 58-60, wherein at least one of said visual indicators comprise a shape and a brightness, color, texture, graphical fill, or pulse associated with said shape, wherein at least one of said audio indicators comprises a verbal or non-verbal sound and sound intensity, frequency, period, or amplitude associated with said verbal or non-verbal sound, wherein at least one of said haptic indicators comprises a vibration and a vibration intensity, frequency, period, or amplitude associated with said vibration, or any combination thereof.
62. The method of any one of embodiments 61, wherein said brightness, color, texture, graphical fill, or pulse is configured to convey information regarding said confidence or probability of improving clinical image quality for said at least one of said visual indicators, wherein said sound intensity, frequency, period, or amplitude is configured to convey information regarding said confidence or probability of improving clinical image quality for said at least one of said audio indicators, wherein said vibration intensity, frequency, period, or amplitude is configured to convey information regarding said confidence or probability of improving clinical image quality for said at least one of said audio indicators.
63. The method of any of embodiments 34-62, further comprising providing instructions for improving clinical image quality using patient instructions, ultrasound scan system settings, or both.
64. The method of embodiment 63, wherein said patient instructions comprise patient breathing or body position.
65. The method of embodiment 63, wherein said ultrasound scan system settings comprises scan depth, gain, or both.
66. The method of embodiment 63, wherein said instructions are not identified based on a threshold correlated with image quality.
67. The method of any of the preceding embodiments, wherein said ultrasound imaging system is a portable ultrasound imaging system.
68. The method of any of the preceding embodiments, wherein said ultrasound imaging system is configured for performing echocardiography.
69. The method of any of embodiments 34-68, further comprising receiving one or more additional ultrasound images acquired through said ultrasound imaging system after displaying said guidance.
70. The method of embodiment 34-69, further comprising analyzing said at least a subset of said one or more ultrasound images or said one or more additional ultrasound images to determine clinical image quality of a video image clip.
71. The method of any one of embodiments 34-70, wherein an imaging workflow of the method further comprises at least one of automatic image saving, best clip saving, automatic image labelling, and automatic diagnostic measurements and/or combinations thereof.
72. The method of embodiment 71, wherein the imaging target comprises a feature of a heart of a subject and the automatic diagnostic measurement is a measurement related to cardiac function.
73. The method of embodiment 72, wherein the measurement related to cardiac function comprises an image-derived EKG or an ejection fraction.
74. The method of any one of embodiments 34-73, further comprising automatically saving multiple instances of the same canonical view and/or the same sub-view based at least partially on detection of diagnostic differences between the multiple instances.
75. The method of embodiment 74, further comprising automatically saving the best image clips of the multiple instances and/or automatically labeling the image clips with the corresponding sub-view.
76. The method of embodiment 75, wherein the automatic labeling further comprises labeling the sub-view with an identifier of whether or not the sub-view corresponds to a standard view (e.g. an on-axis canonical view).
77. The method of any of the preceding embodiments further comprising alerting the user to a need for acquisition of a plurality of non-standard views based on a selected diagnostic procedure.
78. The method of any of the preceding embodiments further comprising alerting the user incidental proximity to a known sub-view, and determining a minimum amount of frames and/or scan time on that sub-view is required for diagnosis and has not yet been achieved, notifying the user that more dwell time is needed to add the incidental sub-view to the study.
79. The method of any of the preceding embodiments, further comprising automatically providing guidance instructions to the user to acquire a sub-view detected by the image probe based on detection that the user has dwelled in a position proximate to the sub-view for longer than a threshold period of time and/or threshold number of frames.
80. The method of any of the preceding embodiments, wherein the guidance instructions comprise providing a quality meter to the user based on the clinical quality of a corresponding sub-view.
81. The method of any of the preceding embodiments, further comprising providing the user with a real-time output of acquisition status (e.g. saving and/or detection of required sub-views) for a selected diagnostic procedure.
82. The method of any of the preceding embodiments, wherein the current position and/or the optimum position is a current probe pose and/or an optimum probe pose.
83. The method of any of the preceding embodiments, further comprising rendering a three-dimensional surface of a target feature of the subject wherein training of the machine learning model is performed without the use of three-dimensional training images.

84. The method of any of the preceding embodiments, wherein the received one or more ultrasound images are received from an ultrasound probe of the ultrasound system wherein the probe uses about 5000 transmit pulses per second or less for image acquisition.

85. An ultrasound system comprising at least one processor, a memory, and a computer executable instructions that, when executed by the at least one processor, causes the processor to perform the method of any of the preceding embodiments.

86. A non-transitory computer-readable storage media encoded with instructions that, when executed by a processor, causes the processor to perform the method of any of the preceding embodiments.

87. A method of training a machine learning algorithm to evaluate ultrasound image quality and/or determine guidance instructions for ultrasound image acquisition, the method comprising:

(a) annotating a plurality of ultrasound images or ultrasound image clips of a plurality of sub-views of target structures of a subject with clinical quality information and/or ultrasound probe position information, the sub-views comprising both canonical views and non-canonical views, the plurality of ultrasound images or ultrasound image clips comprising both optimal and non-optimal images for each sub-view; and (b) submitting the plurality of annotated ultrasound images or ultrasound image clips to a machine learning algorithm configured to classify non-annotated ultrasound images based on a computed clinical quality and/or a computed ultrasound imaging probe position.

88. A method of training a machine learning algorithm to evaluate ultrasound image quality and/or determine guidance instructions for ultrasound image acquisition, the method comprising:

(a) annotating a plurality of ultrasound images or ultrasound image clips of a plurality of sub-views of a target volume of a subject with clinical quality information and/or ultrasound probe position information, the plurality of sub-views comprising a sufficient number of alternate view points of the target volume to construct a representation of a three-dimensional structure of the target volume;

(b) submitting the plurality of annotated ultrasound images or ultrasound image clips to a machine learning algorithm;

(c) constructing the three-dimensional representation of the target volume at least in part using the machine learning algorithm; and (d) configuring the machine learning algorithm to classify non-annotated ultrasound images based on a computed clinical quality and/or a computed ultrasound imaging probe position.

89. The method of any one of embodiments 1-81, wherein the trained machine learning algorithm is trained by the method of 84 or 85.

90. The method, system, or non-transitory computer readable storage medium of any of the preceding embodiments, wherein providing an indication of image quality for each of the least two of the plurality of sub-views includes a mapping of 3D coordinates to a diagnostic quality classification using a sub-view specific logistic function.

What is claimed is:

1. A method for guiding an ultrasound imaging procedure, comprising:

receiving one or more ultrasound images of a subject acquired through an ultrasound imaging system;

evaluating said one or more ultrasound images using a trained machine learning model comprising a representation of a three-dimensional structure of a target volume of the subject to determine a current position of a probe of the ultrasound imaging system and/or a clinical image quality;

identifying an optimal probe position for imaging for at least one sub-view of the target volume of the subject;

generating one or more probe movements for reducing a difference between the current probe position and the identified optimal probe position; and providing guidance instructions to a user of the ultrasound imaging system to make a plurality of generated movements comprising alternate movements corresponding to a single sub-view, wherein the guidance instructions further comprise an indication of a computed confidence or probability of the alternate movements corresponding to the single sub-view.

2. The method of claim 1, wherein the method further comprises:

presenting to a user, a user interface, the user interface comprising a representation of the three-dimensional structure of the target volume of the subject to be imaged; and receiving from the user a selection of a target feature within the target volume, the selection comprising three-dimensional coordinates of the target feature within the target volume.

3. The method of claim 2, wherein the identified optimal probe position comprises an optimal probe position for imaging the selected target feature.

4. The method of claim 2, wherein the representation of the three-dimensional structure of the target volume of the subject to be imaged comprises at least part of the representation comprised by the machine learning model.

5. The method of claim 2, wherein the representation of the three-dimensional structure of the target volume of the subject to be imaged comprises an empirical model of an ideal target volume of the subject.

6. The method of claim 2, wherein the representation of the three-dimensional structure of the target volume of the subject to be imaged is a representation of an empirical model of an ideal target volume of the subject.

7. The method of claim 2, wherein the representation of the three-dimensional structure of the target volume comprised by the machine learning model comprises information about a structural relationship between a common feature comprised in a plurality of sub-views.

8. The method of claim 2, wherein the machine learning model is trained using a plurality of two-dimensional ultrasound image or image clips.

9. The method of claim 8, wherein the machine learning model is trained using a plurality of three-dimensional ultrasound images or image clips.

10. The method of claim 8, wherein the machine learning model is configurable to render a three-dimensional surface of the target volume based on information learned from a collection of training images.

11. The method of claim 10, wherein the collection of training images either (i) does not comprise images collected by a 3D-ultrasound system; or (ii) comprises both two dimensional images and images collected by a 3D-ultrasound system.

12. The method of claim 2, wherein the method comprises rendering a three-dimensional representation of a target feature within the target volume in real time from the received one or more ultrasound images.

13. The method of claim 2, wherein generating the one or more probe movements comprises computing a confidence or probability that a generated probe movement will improve a clinical quality of acquired images.

14. The method of claim 13, wherein the guidance instructions prompt the user to make a determined movement determined to have a highest confidence or probability of improving clinical image quality compared to alternate generated movements.

15. The method of claim 2, further comprising:
displaying a plurality of sub-views, the plurality of sub-views comprising standard canonical views and/or non-standard views indicative of a target feature within the target volume of the subject and the standard canonical views and the non-standard views comprise both on- and off-axis views.

16. An ultrasound system comprising at least one processor, a memory, and an ultrasound imaging probe, the memory comprising computer executable instructions that, when executed by the at least one processor, causes the processor to:
receive one or more ultrasound images of a subject acquired through the ultrasound imaging probe;
evaluate said one or more ultrasound images using a trained machine learning model comprising a representation of a three-dimensional structure of a target volume of the subject to determine a current position of a probe of the ultrasound imaging system and/or a clinical image quality;
identify an optimal probe position for imaging for at least one sub-view of the target volume of the subject;
generate one or more probe movements for reducing a difference between the current probe position and the identified optimal probe position; and
provide guidance instructions to a user of the ultrasound imaging system to make a plurality of generated movements comprising alternate movements corresponding to a single sub-view,
wherein the guidance instructions further comprise an indication of a computed confidence or probability of the alternate movements corresponding to the single sub-view.

17. A non-transitory computer-readable storage media encoded with instructions that, when executed by a processor, causes the processor to:
receive one or more ultrasound images of a subject acquired through an ultrasound imaging probe of an ultrasound imaging system;
evaluate said one or more ultrasound images using a trained machine learning model comprising a representation of a three-dimensional structure of a target volume of the subject to determine a current position of a probe of the ultrasound imaging system and/or a clinical image quality;
identify an optimal probe position for imaging for at least one sub-view of the target volume of the subject;
generate one or more probe movements for reducing a difference between the current probe position and the identified optimal probe position; and
provide guidance instructions to a user of the ultrasound imaging system to make a plurality of generated movements comprising alternate movements corresponding to a single sub-view,
wherein the guidance instructions further comprise an indication of a computed confidence or probability of the alternate movements corresponding to the single sub-view.

* * * * *